(12) United States Patent
Ohyu et al.

(10) Patent No.: US 8,160,316 B2
(45) Date of Patent: Apr. 17, 2012

(54) MEDICAL IMAGE-PROCESSING APPARATUS AND A METHOD FOR PROCESSING MEDICAL IMAGES

(75) Inventors: Shigeharu Ohyu, Yaita (JP); Hitoshi Yamagata, Otawara (JP); Atsuko Sugiyama, Nasushiobara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 1307 days.

(21) Appl. No.: 11/779,680

(22) Filed: Jul. 18, 2007

(65) Prior Publication Data

US 2008/0019580 A1    Jan. 24, 2008

(30) Foreign Application Priority Data

Jul. 18, 2006  (JP) .................................. 2006-195354

(51) Int. Cl.
*G06K 9/00* (2006.01)

(52) U.S. Cl. ....................................................... 382/128

(58) Field of Classification Search .................. 382/128, 382/130, 131, 132
See application file for complete search history.

(56) References Cited

U.S. PATENT DOCUMENTS

2007/0217665 A1 * 9/2007 Kiraly et al. .................. 382/128

FOREIGN PATENT DOCUMENTS

| JP | 2005-334219 | 12/2005 |
|---|---|---|
| WO | WO 2005/010793 A2 | 2/2005 |
| WO | WO 2005/010793 A3 | 2/2005 |

OTHER PUBLICATIONS

Hidenori Shikata, et al., "An Algorithm for Localizing Branch Points of Pulmonary Vessels for Nonrigid Registration of the Lungs", Systems and Computers in Japan, vol. 35, No. 3, XP-002531417, Mar. 2004, pp. 24-36.
G. Elisabeta Marai, et al., "Super-Resolution Registration Using Tissue-Classified Distance Fields", IEEE Transactions on Medical Imaging, vol. 25, No. 2, XP-02531418, Feb. 2006, pp. 177-187.
U.S. Appl. No. 12/525,315, filed Jul. 31, 2009, Ohyu, et al.
Hidenori Shikata, et al., "An Algorithm for Localizing Branchpoints of Pulmonary Vessels for Non-rigid Registration of the Lung", The Transactions of the Institute of Electronics, Information and communication Engineers D-II, vol. J85-D-II, No. 10, Oct. 2002, 2 front pages, pp. 1613-1623 and pp. 1-6 (with partial English translation).
Jeongtae Kim, et al., "Intensity-Based Image Registration Using Robust Correlation Coefficients", IEEE Transactions on Medical Imaging, vol. 23, No. 11, Nov. 2004, pp. 1430-1444.
J. B. Antoine Maintz, et al., "A Survey of Medical Image Registration", Medical Image Analysis, vol. 12, No. 1, 1998, pp. 1-37.

* cited by examiner

*Primary Examiner* — Claire X Wang
(74) *Attorney, Agent, or Firm* — Oblon, Spivak, McClelland, Maier & Neustadt, L.L.P.

(57) ABSTRACT

The extraction processor of the medical image-processing apparatus sets landmarks of each medical image based on volume data of two medical images. The positional relationship information-generating part generates positional relationship information that indicates positional relationship of the landmarks for each of the two medial images. The landmark-coordinating part eliminates one or more landmarks from each medical image based on the positional relationship information. Further, the landmark-coordinating part coordinates the landmarks of two medical images that remained after the elimination. The image-aligning part aligns the two sets of volume data based on the result of the coordination of landmarks.

8 Claims, 9 Drawing Sheets

MEDICAL IMAGE-PROCESSING APPARATUS AND A METHOD FOR PROCESSING MEDICAL IMAGES

BACKGROUND OF THE INVENTION

1. Field of the Invention

The present invention relates to a medical image-processing apparatus and a method for processing medical images, for processing image data of medical images. In particular, the present invention relates to a technology for aligning two medical images (image data thereof).

2. Description of the Related Art

Conventionally, a plurality of medical images of a subject taken at different times has been compared to ascertain the progress of a disease or state of treatment for examination of treatment policy (e.g., refer to Japanese Patent Laid-Open No. 2005-334219). In such a comparative interpretation of radiograms, it is necessary to align images that have been taken at different times in order to compare slice images (such as CT image) at the approximately same position as the subject. Along with the introduction in recent years of apparatuses that can obtain three-dimensional medical images, alignment of three-dimensional medical images has been necessary.

As for methods for aligning images, a repeated alignment method using similarities of images and an alignment method using landmarks (also known as "feature points") are generally known.

The repeated alignment method using similarities of images has been disclosed, for example, in "Intensity-Based Image Registration Using Robust Correction Coefficients" by Jeongtae Kim, Jefferey A. Fessler, IEEE TRANSACTIONS ON MEDICAL IMAGING, VOL. 23, No. 11, NOVEMBER 2004, pp. 1430-1444. This method includes repeated alignments using similarities of images such as correlation coefficients. This method is divided into a method called "rigid registration," which is alignment without causing deformation of the image, and a method called "non-rigid registration," which is alignment causing deformation of the image. In this specification, both of these methods are referred to as "registration."

On the other hand, an alignment method using landmarks has been disclosed in "A Algorithm for Localizing Branching Points of Pulmonary Vessels for Non-Rigid Registration in Lung" by SHIKATA Hidenori et al., IEICE TRANSACTIONS, VOL. J85-D-II, No. 10, 2002, pp. 1613-1623), for example. The process time of this method is essentially shorter than the repeated alignment method that uses similarities of images. In other words, once the landmarks have been designated, a linear optimization method can be applied for the alignment of a pair of landmarks. Because repetition is unnecessary, it is possible to align images with a short process time of approximately 1 second or less, even when the data volume is large.

However, the following problems are involved in such conventional alignment methods described above.

First, in the repeated alignment method using similarities of images, a few dozens of local regions are set for each image to be compared, and similarities of images are calculated for each pair of corresponding local regions. At the same time, it repeatedly performs a process such as parallel shifting, rotation, scaling (size change), and deformation of images so that the degree of similarities of images becomes higher. This method is effective to some extent for two-dimensional images having small data volume, but for three-dimensional images having dramatically higher data volume, a long process time is required, so it can hardly be regarded as practical at the current stage.

For example, it is described in the aforementioned document "Intensity-Based Image Registration Using Robust Correction Coefficients" that it takes approximately 0.1 seconds to calculate image similarities of the local regions of two-dimensional images that are 10×10 pixels in size. If a similar process is applied to the local regions of three-dimensional images of that are 10×10×10 voxels in size, it is estimated to take simply 10×0.1=1 second. Therefore, when 50 pairs of local regions are set in a three-dimensional image, for example, it requires approximately 1×50=50 seconds per calculation.

Moreover, a publicly known optimization method is used for the algorithm of image alignment, and it has been known that the number of repetitions increases as the number of variables increases. For example, in non-rigid registration of three-dimensional images, it is necessary to optimize a few dozens of variables, which requires at least about 100 repetitions of calculation. Therefore, it is estimated to take approximately 50×100=5,000 seconds (approximately 83 minutes) for the alignment of three-dimensional images. Under such circumstances, it is expected to be difficult to achieve practical process time, even if a high-speed process method were to be added.

Meanwhile, in the alignment method using landmarks, there is a merit of shorter process time as described above, but there is difficulty in achieving accurate alignment. In other words, as described in the aforementioned document "A Algorithm for Localizing Branching Points of Pulmonary Vessels for Non-Rigid Registration in Lung," when aligning an image containing pulmonary vessels, for example, in order to align precisely using landmarks, a highly precise determination of the position of branching points and an accurate graph representation of vessels are necessary. This is because an accuracy of specifying the corresponding landmarks is reflected in the accuracy of alignment for the landmark group extracted independently from each of the two images to be compared.

Moreover, in reality, it is extremely difficult to attain an accurate graph representation of an object with a complex network such as pulmonary vessels. This also has become a large obstacle in improving the accuracy of the alignment method using landmarks. In particular, because accuracy is regarded as very important in the medical field in order to avoid medical errors, it is believed that the alignment method using landmarks has low usability.

SUMMARY OF THE INVENTION

The objective of the present invention is to solve the above-mentioned problems and to provide a medical image-processing apparatus as well as a method for processing medical images, in order to reduce the time for aligning medical images with a high degree of accuracy.

In a first aspect of the invention, a medical image-processing apparatus that aligns volume data of two medical images, comprising: a setting part configured to set landmarks of medical images based on each set of volume data; a generating part configured to generate positional relationship information that indicates the positional relationships of said landmarks with regard to each set of volume data; a coordinating part configured to coordinate between the landmarks of two medical images that remain after eliminating some of the landmarks based on said positional relationship information;

and an alignment part configured to align two sets of volume data based on said coordination of landmarks.

According to the first aspect of this invention, it is possible to reduce the time of alignment with a high degree of accuracy, because the volume data is aligned using landmarks that remain after eliminating some of the landmarks based on the positional relationship of landmarks in the medical image.

In a second aspect of the invention, a medical image-processing apparatus that aligns volume data of two medical images, comprising: a setting part configured to set landmarks of medical images based on each set of the volume data; a coordinating part configured to coordinate the landmarks of the two medical images; a transformation parameter calculation part configured to calculate coordinate transformation parameter to align the position of one set of volume data to the position of the other set of volume data based on the landmark coordination; and a transformation parameter correction part configured to correct the parameter according to the distance, which has been calculated by the distance between the coordinated landmarks after the alignment based on the parameter; and wherein the position of the two sets of volume data is aligned based on the corrected parameter.

According to the second aspect of this invention, the coordinate transformation parameter is calculated based on the coordination of landmarks of medical images, the distance between the landmarks is calculated when aligning based on the parameters, and two sets of volume data are aligned based on the parameters corrected according to the distance. Therefore, high-precision alignment can be achieved in a relatively short amount of time In a third aspect of the invention, a medical image-processing apparatus that aligns volume data of two medical images, comprising: a specific portion extracting part configured to extract image region that corresponds to the right and left lungs of a subject for each medical image; a landmark setting part configured to execute the processes of: detecting the position of apical portion and the position of the lower end of each lung in the image region; detecting the left end position of the left lung image region and the right end position of the right lung image region in the cross-section position, which internally divides the position of apical portion and the position of the lower end in the image region by a predetermined ratio, and setting the landmarks of each medical image based on the position of the apical portion, the position of the lower end, the position of the left end and the position of the right end; a coordinating part configured to coordinate the landmarks in two medical images; and an alignment part configured to align two sets of volume data based on the coordination of landmarks.

According to the third aspect of this invention, it is possible to detect the position of the apical portion and the positions of the lower ends of each lung, as well as the left end position of the left lung and the right end position of the right lung in the image region that corresponds to the right and left lungs of a subject for each medical image. Furthermore, according to this third aspect of the present invention, it is possible to set the landmarks of each medical image based on these positions, coordinate the landmarks of two medical images each other, and align two sets of volume data based on that coordination. Thus, the high-precision alignment of volume data of lung images can be performed in a relatively short amount of time.

In a fourth aspect of the invention, a method for processing medical image that aligns volume data of two medical images, comprising the steps of: setting landmarks of medical image based on each set of volume data; generating positional relationship information indicating positional relationship of the landmarks for each set of the volume data; coordinating between landmarks of two medical image that remained after elimination of some landmarks based on the positional relationship information; and aligning the two sets of volume data based on the coordination of landmarks.

According to the fourth aspect of this invention, a high-precision alignment can be performed while reducing the time needed to perform the alignment, because the alignment of volume data is performed using landmarks that remain after eliminating some of the landmarks based on the positional relationship of landmarks in the medical image.

In a fifth aspect of the invention, a method for processing medical image that aligns volume data of two medical images, comprising the steps of: setting landmarks of medical image based on each set of volume data; coordinating between the landmarks of the two medical images; calculating coordinate transformation parameter for aligning the position of one set of volume data to the position of the other set of volume data based on the coordination of landmarks; calculating distance between the coordinated landmarks after the alignment based on the parameter; correcting the parameter according to the distance; and aligning the two sets of volume data based on the corrected parameter.

According to the fifth aspect of this invention, the coordinate transformation parameter is calculated based on coordination of the landmarks of medical images, the distance between the landmarks is calculated when alignment was performed based on the parameters, and the alignment of two sets of volume data is performed based on the parameters corrected according to the distance. Therefore, high-precision alignment can be achieved within a relatively short amount of time.

In a sixth aspect of the invention, A method for processing medical image that aligns volume data of two medical images, comprising the steps of: extracting image region that corresponds to the right and left lungs of a subject for each medical image; detecting the position of apical portion and the position of the lower end of each lung in the image region; detecting the left end position of the left lung image region and the right end position of the right lung image region in the cross-section position, which internally divides the position of apical portion and the position of the lower end in the image region by a predetermined ratio; setting the landmarks of each medical image based on the position of the apical portion, the position of the lower end, the position of the left end and the position of the right end; coordinating the landmarks of two medical images; and aligning two sets of volume data based on the coordination of landmarks.

According to the sixth aspect of this invention, it is possible to detect the position of the apical portion and the positions of the lower ends of each lung, as well as the left end position of the left lung and the right end position of the right lung in the image region that corresponds to the right and left lungs of a subject for each medical image. Furthermore, according to this sixth aspect of the present invention, it is possible to set the landmarks of each medical image based on these positions, coordinate the landmarks of the two medical images each other, and align the two sets of volume data based on that coordination. Thus, high-precision alignment of volume data of the lung images can be performed within a relatively short amount of time.

DETAILED DESCRIPTION OF THE PREFERRED EMBODIMENTS

One example of an embodiment of the medical image-processing apparatus and the method for processing medical images in connection with the present invention will be described in detail with reference to drawings. The present embodiment describes the alignment of image data of medical images of the lungs of a subject. Generally, the medical images of lungs show the lung parenchyma part, bronchial tubes, and pulmonary vessels (pulmonary artery, pulmonary vein). In addition, image data may be identified with the medical image displayed based on this image data in the embodiment.

Overview

The following embodiment is intended to perform preferable alignment of images at the time of comparative interpretation of radiograms of medical images obtained by a medical image diagnostic apparatus. In the comparative interpretation of a radiogram, the progression of an illness or injury or efficacy of treatment is determined by comparing the most recent photographic image (newest image) and the image that was taken in the past (past image). When slice images of a subject are compared, it is necessary to display the most recent image and the past image in the approximately same slice position of the subject body.

In addition, technically, the anteroposterior relation of the images to be compared has no relation to implementation of the alignment system, so in the present specification, one of the images will be called a "reference image" and the other image will be called a "target image," and the method for aligning the two images will be described.

Figure 7:
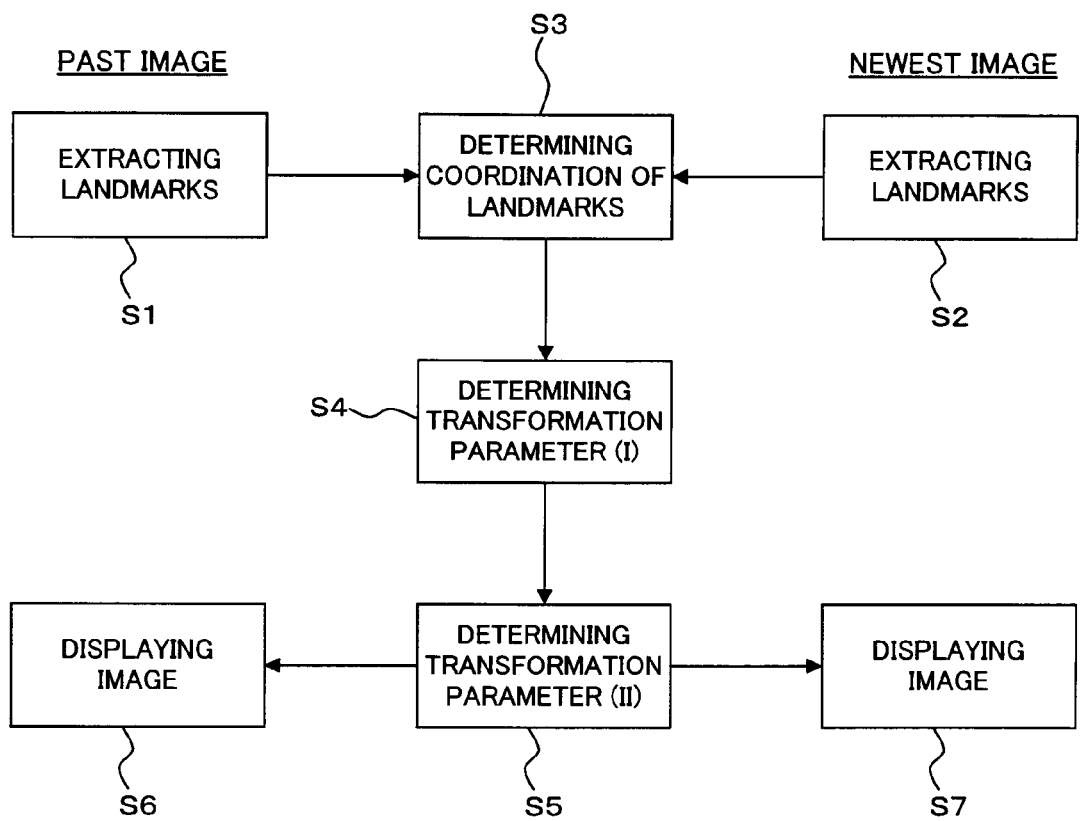
FIG. 7 is a schematic diagram showing an example of the process flow of an embodiment of the medical image-processing apparatus related to the present invention.

FIG. 7 shows an example of the process flow via the present embodiment. First, landmarks are extracted from the past image and the newest image (S1 and S2). As the landmarks, for example, branching points of pulmonary vessels may be extracted. Regarding the method for specifying the branching point of blood vessels, an example has been disclosed in the previously mentioned Non-Patent Document 2. In addition, the extraction of landmarks does not have to be in any fixed order between the past image and newest image, and the number of landmarks also does not have to be the same. In addition, the landmarks are the marks (feature points) that are artificially set for the distinctive sites in a medical image, and they become the fiducials when aligning the two medical images (image data thereof).

Next is to determine coordination of the landmarks extracted from the past image and newest image (S3). In the present embodiment, coordination between landmarks of the past image and landmarks of the newest image will be determined by information of the distance between the landmarks (or information of the angle formed by the landmarks). Details will be described later, but such coordination enables the alignment of images, even when there is an error in extracting landmarks, or when the branch structure of blood vessels cannot be identified correctly. This is one of the characteristics of the embodiment.

In the next step of determining the transformation parameter (I), a linear optimization method is applied to the coordinated landmarks, and the coordinate transformation parameters between these landmarks are determined (S4). Hereinafter, an example of this process will be described. With coordinates of the landmarks of the newest image as ($r1$, $r2$, and $r3$), and coordinates of the landmarks of the past image as ($t1$, $t2$, and $t3$), assume that coordination between these landmarks has been accomplished. Furthermore, these landmarks are expressed by the following equations:

$$t1-r1 = a1 \times r1 + b1 \times r2 + c1 \times r3 + d1$$

$$t2-r2 = a2 \times r1 + b2 \times r2 + c2 \times r3 + d2$$

$$t3-r3 = a3 \times r1 + b3 \times r2 + c3 \times r3 + d3$$

Herein, the twelve coefficients—$ai$, $bi$, $ci$, and $di$ ($i=1, 2, 3$)—are the transformation parameters that should be obtained. This simultaneous equation has three equations and has twelve unknown quantities, so it is impossible to uniquely solve them by themselves, but if the coordinates of at least four pairs of landmarks are known, the twelve transformation parameters can be obtained by using publicly known linear optimization methods such as the least-square method.

When some of the landmarks in the group extracted in Steps S1 and S2 are extremely close to each other, it may lead to errors in the coordination process in Step S3. If a coordination error occurs, the result of aligning the landmarks with inaccurate coordination will be reflected in alignment of the entire image (volume data of the image), and accuracy will be degraded in Step S4.

Given this factor, in the present embodiment, accuracy in the alignment of images (volume data thereof) will be improved during determination of the transformation parameters (II) by eliminating or reducing the effect of landmarks having a large residual error after alignment to obtain the transformation parameters again (S5).

Using these results of alignment, tomographic images in approximately the same slice position for the past image and newest image are displayed in parallel (S6 and S7). Then, the doctors can perform a comparative interpretation of a radiogram of the past and newest tomographic images displayed in parallel.

Construction and Operation

Figure 1:
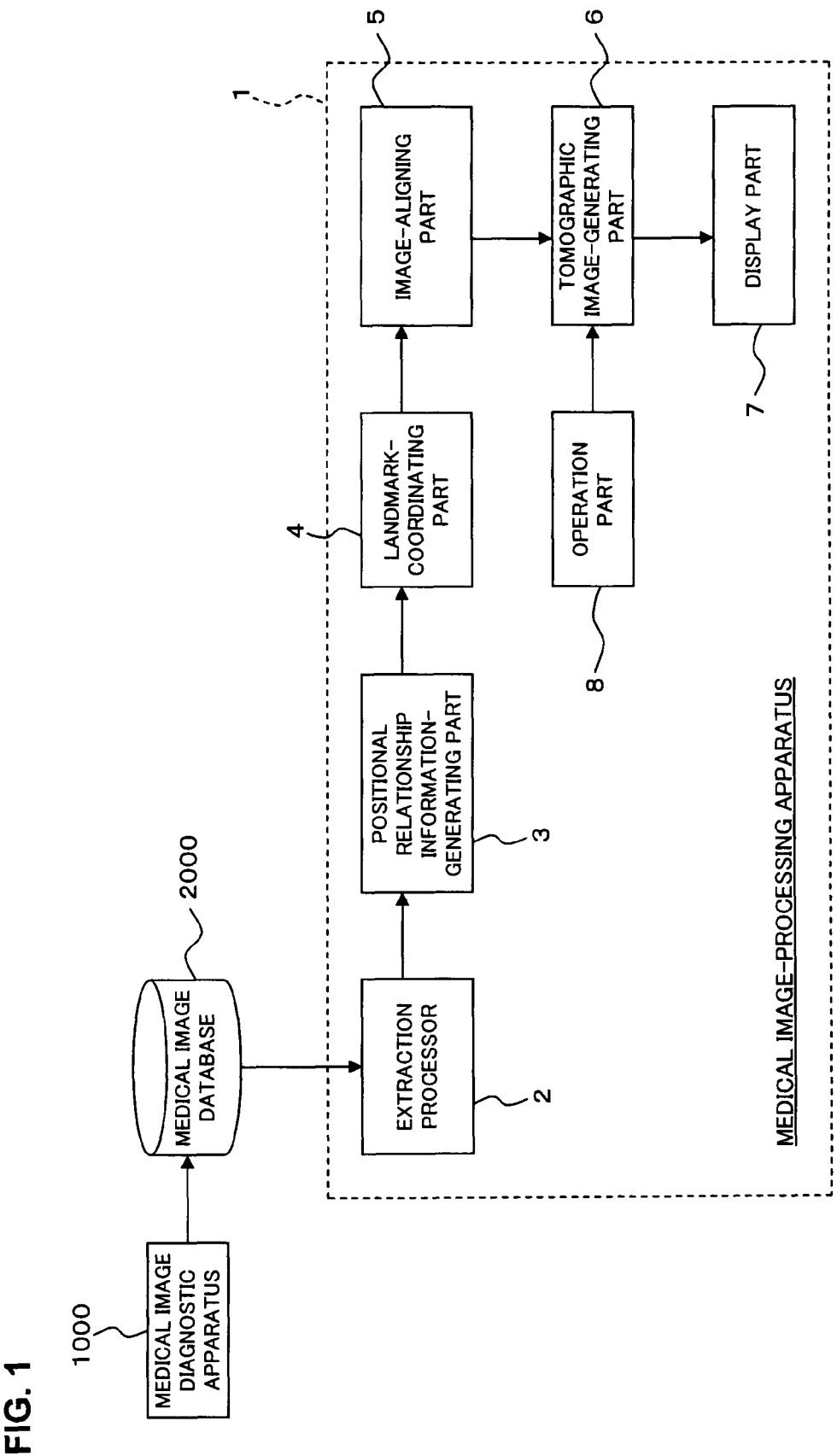
FIG. 1 is a schematic block diagram showing an example of the overall composition of an embodiment of the medical image-processing apparatus related to the present invention.

The construction and operation of the medical image-processing apparatus related to the present invention will be described. The medical image-processing apparatus 1 shown in FIG. 1 is connected to a medical image database 2000 that stores image data of medical images generated by the medical image diagnostic apparatus 1000. The medical image-processing apparatus 1, medical image diagnostic apparatus 1000, and medical image database 2000 are connected to enable communication via an arbitrary network such as a LAN (Local Area Network).

The medical image diagnostic apparatus 1000 is an apparatus for generating image data of medical images based on signals that reflect the configuration of the inside of a subject's body (not shown). Specific examples of the medical image diagnostic apparatus 1000 can be listed as an X-ray CT (Computed Tomography) apparatus, X-ray diagnostic apparatus, MRI (Magnetic Resonance Imaging) apparatus, PET (Positron Emission computed Tomography), SPECT (Single Photon Emission Computed Tomography), and ultrasound diagnostic apparatus. In particular, this medical image diagnostic apparatus 1000 should be an apparatus that can generate image data (volume data) of a three-dimensional medical image of a subject.

Herein, the volume data is image data having three-dimensional voxels as pixels. Pixel data such as brightness, shading, and color has been allocated for each voxel. In addition, the volume data may be called voxel data. To display an image based on volume data, the three-dimensional volume data is converted to two-dimensional image data via rendering such as volume rendering and MIP (Maximum Intensity Projection).

The medical image database 2000 is, for example, a system that manages image data of various medical images. It may be composed of a database of PACS (Picture Archiving and Communication System) or a database of an electronic medical record system that manages medical records with images.

In addition, a network can be constructed so that image data can be input directly from the medical image diagnostic apparatus 1000 to the medical image-processing apparatus 1.

As shown in the FIG. 1, the medical image-processing apparatus 1 comprises an extraction processor 2, positional relationship information-generating part 3, landmark-coordinating part 4, image-aligning part 5, tomographic image-generating part 6, display part 7, and an operation part 8. Hereinafter, each of these parts will be described in detail.

Display Part and Operation Part

First, the display part 7 and operation part 8 will be described. The display part 7 and operation part 8 are included in the user interface of the medical image-processing apparatus 1. The display part 7 is a display device that displays medical images obtained by the medical image diagnostic apparatus 1000. For example, multiple medical images (e.g., the newest image and past image) are displayed in parallel on the display part 7. The display part 7 functions as an example of a "display part" of the present invention.

The operation part 8 is an operating device (input device) to be used for various data entry or operational request entry for the medical image-processing apparatus 1. By operating this operation part 8, a user can enter requests, for example, for acquisition of image data from the medical image database 2000, or for the medical images desired to be displayed on the display part 7.

A request for acquisition of image data can be performed by, for example, entering a patient ID of the subject for interpretation of a radiogram, and an operating software key that requests the acquisition of image data.

Moreover, requests to display desired medical images can be listed, for example, as request to display a tomographic image in a desired slice position (cross-section position) of a subject. A screen region is provided on a screen displayed on the display part 7 for the interpretation of a radiogram to specify the slice position. This screen region includes, for example, an input space for specifying the slice position with a numeric value (coordinates), a software key for specifying the slice position on a scanogram, and a software key for performing image riffling functions that display multiple tomographic images in order, according to the slice direction. The user specifies the slice position by performing a predetermined operation on the screen region. The display part 7 displays a tomographic image in the specified slice position.

Extraction Processor

Figure 2:
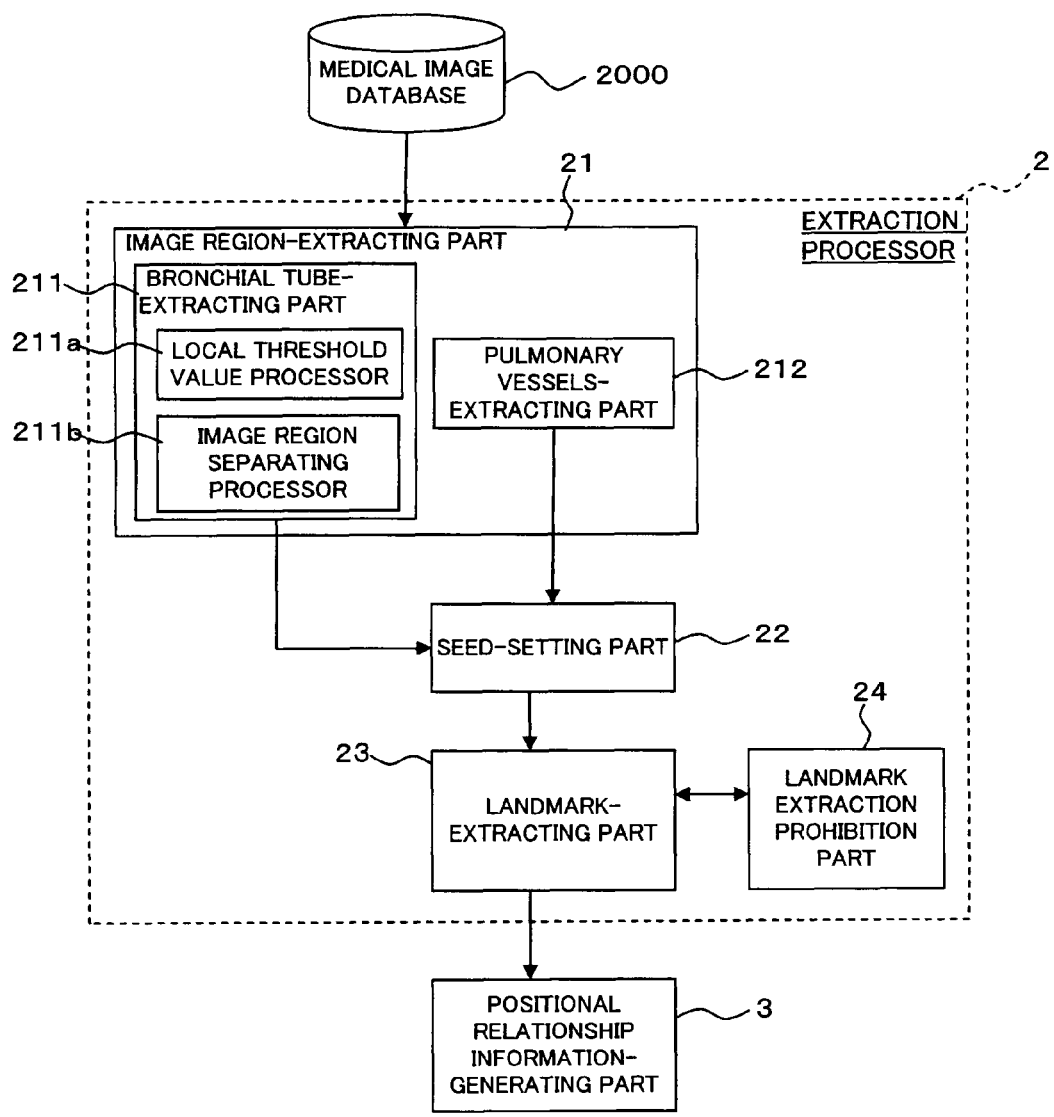
FIG. 2 is a schematic block diagram showing an example of composition of the extraction processor of an embodiment of the medical image-processing apparatus related to the present invention.

The block diagram in FIG. 2 shows an example of composition of the extraction processor 2. This extraction processor 2 sets landmarks inside medical images, and it is constructed as an example of a "setting part" of the present invention. The extraction processor 2 comprises an image region-extracting part 21, a seed-setting part 22, a landmark-extracting part 23, and a landmark extraction prohibition part 24. Hereinafter, each of these parts 21-24 will be described in detail.

Image Region-Extracting Part

The image region-extracting part 21 extracts an image region that corresponds to a specific site from the volume data of medical images entered from the medical image database 2000.

In the present embodiment, the process will be performed on medical images of a lung. These medical images contain image regions that correspond to sites having a branching structure such as an image region that corresponds to bronchial tubes and an image region that corresponds to pulmonary vessels. A bronchial tube-extracting part 211 that extracts an image region that corresponds to bronchial tubes (may be referred to as a bronchial tube region) and a pulmonary vessel-extracting part 212 that extracts an image region that becomes a candidate for the image region that corresponds to pulmonary vessels (may be referred to as pulmonary vessels candidate region) are set by the image region-extracting part 21.

First, extraction of a bronchial tube region will be described. The pixel values (such as CT value (CT number)) of the image region that corresponds to the pulmonary parenchyma part (may be referred to as lung parenchyma region) are not uniform, and the values are close to the pixel value of the bronchial tube region. Therefore, when the bronchial tube region is extracted with a single threshold value, and the threshold value is set at a comparatively low value, only the image region of the thick part of the bronchial tubes will be extracted. Moreover, if the threshold value is set to a comparatively high value, the lung parenchyma region adjacent to the bronchial tube region may also be extracted (this is called "overflow" in the present specification). In order to extract the image region that corresponds to the distal site of bronchial tubes (the tip of branched bronchial tubes) as much as possible without causing overflow, the threshold value needs to be adjusted for each patient. Therefore, in the present embodiment, the bronchial tube region will be extracted by using a localized threshold value process (local threshold value process).

The bronchial tube-extracting part 211 comprises the local threshold value processor 211*a* and an image region separating processor 211*b*.

The local threshold value processor 211*a* extracts the bronchial tube region by local threshold value process. More specifically, the local threshold value processor 211*a* first obtains the threshold value surface based on image data of medical images (volume data and image data of tomographic images). The threshold value surface can be obtained by applying a predetermined constant to the result of a morphological process such as erosion of a few voxels level to grayscale image data.

Next, the local threshold value processor 211a processes the threshold value of the pixel value of image data using the obtained threshold value surface. In other words, the pixel value is compared to the value of the threshold value surface for each pixel, and based on their magnitude relation, the image region to be a candidate for the bronchial tube region is extracted.

Extraction by the above-described local threshold value process can extract a relatively distal site of bronchial tubes compared to when a single threshold value is used, but it may extract regions other than the bronchial tubes (such as the lung parenchyma region).

In order to solve such a problem, the image region separating processor 211b separates the bronchial tube region extracted by the local threshold value processor 211a from the region surrounding the bronchial tube region using a morphological calculation. Examples of the morphological calculation may include the application of a morphological process of binary images, erosion that has the effect of reducing the number of pixels of an image, or a similar process. With that, fine line parts in the medical image can be removed, and the bronchial tube region is separated from the other regions.

Although the bronchial tube region and other regions are separated in the medical image obtained by the image region separating processor 211b, it is not preferable to extract the bronchial tube region from this medical image, because the bronchial tube region has been thinned down by the above morphological calculation.

Therefore, in addition to extracting image regions (image regions surrounding the bronchial tube region) other than the bronchial tube region separated by the image region separating processor 211b, the bronchial tube-extracting part 211 calculates morphology such as a dilation process for slightly enlarging image regions other than the bronchial tube region, and then removes the image regions other then the bronchial tube region from the image regions extracted by the local threshold value processor 211a. With these processes, overflow from the bronchial tube region to the surrounding regions can be removed. Finally, the connected region of the image region that corresponds to the trachea is detected, and by extracting the connected region, the desired bronchial tube region can be extracted.

Pulmonary Vessels-Extracting Part

The image region that corresponds to the pulmonary artery and pulmonary vein has pixels value that are significantly different from the pulmonary parenchyma region, so it is possible to extract distal part to a certain degree via a normal threshold value process. However, this causes problems such as difficulty in separating the bronchial tube wall and the pulmonary vessels in the hilar area due to their close pixel values, or having extremely numerous branching points (landmarks) due to the extraction of many fine blood vessels. Therefore, the pulmonary vessels-extracting part 212 extracts pulmonary vessels using the following threshold value process to handle these problems.

First, the pulmonary vessels-extracting part 212 extracts the image region that corresponds to lungs. Then, for example, by calculating morphology such as dilation of 1-5 voxels on the extracted image region, it removes the fine holes caused by the fine blood vessels. This is followed by calculating morphology such as erosion of 5-30 voxels to remove the image region that corresponds to the hilar area (the site in the vicinity of the entrance where the trachea descends into the lung and the site near the bronchial tubes of both lungs) in the image region. The image obtained by this process will become a image region for extracting pulmonary vessels (pulmonary vessels extraction target region).

Furthermore, the pulmonary vessels-extracting part 212 extracts, for example, the image region having a CT value of (−300) to (−700) HU (Hounsfield Unit: CT value unit) or higher, by performing a threshold value process on the pulmonary vessels extraction target region. Next, it removes the fine blood vessels, for example, by calculating morphology such as an erosion of 1-5 voxels. This is followed by the extraction of the common region between said image region in which fine blood vessels have been removed and the pulmonary vessels extraction target region. Through the process above, the pulmonary vessels-extracting part 212 obtains the image region that becomes the candidate for the image region that corresponds to pulmonary vessels (pulmonary vessels candidate region).

Seed-Setting Part

The seed-setting part 22 sets the positions as the origin (seed) for extracting landmarks (branching points) of pulmonary vessels within the pulmonary vessels candidate region extracted by the pulmonary vessels-extracting part 212.

More specifically, first of all, the seed-setting part 22 performs the morphological calculation such as erosion on the pulmonary vessels extraction target region, and extracts the interior region of the pulmonary vessels extraction target region, as well as removing the interior region from the pulmonary vessels extraction target region (by calculating the difference between the pulmonary vessels extraction target region and said interior region) to obtain the boundary region of the pulmonary vessels extraction target region. Then, the image region that corresponds to the end part of pulmonary vessels (pulmonary vessels end part region) is obtained by extracting the common region between this boundary region and the pulmonary vessels candidate region.

The seed-setting part 22 sets the seeds for extracting landmarks of pulmonary vessels in arbitrary positions within the pulmonary vessels end part region, such as barycentric position of each connected region of said image region, or a whole of the pulmonary vessels end part regions.

Furthermore using a method similar to the pulmonary vessels, the seed-setting part 22 sets the seeds to the positions closest to the base of the trachea in the bronchial tube region that was extracted by the bronchial tubes-extracting part 211.

Landmark-Extracting Part

The landmark-extracting part 23 performs the process of extracting landmarks (branching points) of the sites of subject having branching structure. The landmark-extracting part 23 performs following two landmark extraction process: (1) extraction process of landmarks within the bronchial tube region extracted by the bronchial tubes-extracting part 211; (2) extraction process of landmarks within the pulmonary vessel region based on the seeds set by the seed-setting part 22. In addition, since these two landmarks extraction process are essentially the same thing, at this time, the extraction process of landmarks within the bronchial tube region will be described in detail.

Meanwhile, as for the extraction of landmarks from the subject having branching structure, a thinning process has been widely used. However, with a method using the thinning process, due to the small concavo-convex on the surface of the subject, fine "hair" are generated in parts that are not branching points, thus the branching points cannot be extracted accurately. To solve this problem, it is necessary to remove the "hair" in the thinned image, but since the thickness of bronchial tubes and pulmonary vessels varies depending on the site, it is difficult to set a good criteria for the "hair" removal, thus it is not easy to solve said problem (regarding the above content, for example, refer to the following literatures: aforementioned document "A Algorithm for Localizing Branching Points of Pulmonary Vessels for Non-Rigid Registration in Lung" by SHIKATA Hidenori et al., (2002); "A Sequential Thinning Algorithm for Three Dimensional Digital Pictures Using the Euclidean Distance Transformation and Its Properties" by SAITO et al., IEICE TRANSACTIONS, J79-D-II, 10, pp. 1675-1685 (October 1996); and "Deletability of 1-Voxels and a Shrinking Algorithm for 3-Dimensional Digitized Pictures" by YONEKURA et al., IEICE TRANSACTIONS, J65-D, 12, pp. 1543-1550 (December 1982).

Therefore, the present embodiment employs a method of sequentially extracting the branching points by gradually enlarging the region within the image region of the subject having branching structure (bronchial tube region and pulmonary vessel region). This method is described in aforementioned document "A Algorithm for Localizing Branching Points of Pulmonary Vessels for Non-Rigid Registration in Lung" by SHIKATA Hidenori et al., (2002). In addition, in the embodiment, the extraction of landmarks is performed at the same time it performs the process of preventing the overflow (landmark extraction prohibition part 24: to be described).

First, the landmark-extracting part 23 enlarges the voxels by one layer at a time with the seeds (position of trachea base), which have been set in the bronchial tube region by the seed-setting part 22, as origins, and obtains the common region (cross-section thereof) between the voxels enlarged (added) in each step and the bronchial tube region. In this way of obtaining the common region (cross-section thereof) as enlarging the voxels, when it passes through a branching point, the connected region of the common region (or the cross-section of common region) is divided into a multiple pieces.

The landmark-extracting part 23 detects the branching points by detecting changes in the number of pieces of the connected region or the cross-section. Moreover, for example, in the previous step, the barycentric position or the center position of voxels are calculated to be used as the branching point.

Landmark Extraction Prohibition Part

The landmark extraction prohibition part 24 performs the process of preventing the overflow concurrently with the landmark extraction process by the landmark-extracting part 23.

In addition, it also performs the process of preventing the overflow at the time the bronchial tube region is extracted by the bronchial tube-extracting part 211. However, it is desirable to configure so as to perform the process again to prevent the overflow at the time of extracting landmarks so that the overflow that was not detected at the time of extracting the bronchial tube region can be removed.

The landmark extraction prohibition part 24 determines whether the common region and/or cross-section has increased its size than in the previous step by the predetermined size or more, in the step where the landmark-extracting part 23 enlarges the voxels. This process is performed by calculating the size of the common region (or cross-section thereof) in each step, and comparing the size in the step and the size in the previous step to determine whether the size change is the predetermined value or more.

When the size change has been determined to be less than the predetermined value, the landmark extraction prohibition part 24 gives an instruction to the landmark-extracting part 23 to continue the extraction process of landmarks for the trachea or branches of blood vessel. On the other hand, when the size change has been determined to be the predetermined value or higher, it gives an instruction to stop the extraction process of landmark for the trachea or branches of blood vessel after this step. With that, the process by the landmark-extracting part 23 will be terminated at the step previous to the present step. Through such process, the areas where the common region or the cross-section has suddenly become larger (in other words, the area where the overflow has occurred) can be detected and it can prohibit the subsequent landmark extraction process.

In addition, it is not necessary to perform the process by the landmark extraction prohibition part 24 in each step of the voxel enlargement. For example, there is no need to perform the landmark prohibition process when searching for the branching points in the region where trachea or blood vessels have a certain thickness and enlarging voxels by only few steps from the seeds. To accomplish that, for example, it can be configured to calculate the size of the common region or the cross-section, then to perform the process of comparing the size with the previous size, only when the size is the predetermined size or less.

As described above, performing the landmark extraction process and the overflow removing process concurrently is one of the characteristic of the present embodiment. For example, this concurrent process is performed as follows. The landmarks (branching points) are extracted by the above-described method, which gradually enlarges the voxels with the seeds as origins. At this time, in each enlargement step, identification data (label) for differentiating the layers is given to each of the voxels in the layer that was added in this step. Moreover, a flag is given to each of the voxels in the common region or the cross-section, or to the voxel that represent the common region or the cross-section, as well as giving information (flag of size) that indicates the volume of the common region or the area of the cross-section (i.e. size). By referring to these labels and flags, the landmark extraction process and the overflow removing process can be performed concurrently.

Positional Relationship Information-Generating Part

The positional relationship information-generating part 3 generates the positional relationship information that indicates the positional relationship of landmarks extracted by the landmark-extracting part 23, and functions as an example of "generating part."

The positional relationship information is the information used for the alignment of the reference image and the target image used in the comparative interpretation of radiogram, being the image for coordinating between landmarks of both images. As for the positional relationship information, for example, a distance list (distance information) that contains information of distance between two landmarks and an angular list (angular information) that contains information of a polygonal angle formed by three (or more) landmarks can be listed. The use of the distance list will be described here, and the use of the angular list will be described later in the section of [Modified example].

The positional relationship information-generating part 3, in order to generate the distance list, forms a plurality of pairs comprising two landmarks based on the landmarks extracted by the landmark-extracting part 23, and calculates the distance between the two landmarks in each pair. Then, it generates the distance list by associating the information that identifies each landmark (or the information that identifies each pair) with the distance between each pair.

The positional relationship information-generating part 3 generates the distance list respectively for the reference image and the target image. The distance list of the reference image is the list of information, in which the distance Dr (i1, i2) between the landmarks ri1 and ri2, which are contained in each pair of the multiple pairs, has been collected for each pair formed based on the landmarks extracted from the reference image. Moreover, the distance list of the target image is the list of information, in which the distance Dt (j1, j2) between the landmarks tj1 and tj2, which are contained in each pair of the multiple pairs, has been collected for each pair formed based on the landmarks extracted from the target image. Each of the distance lists is generated in a way, for example, to line up the pairs of landmarks in an order of increasing based on the distance.

At this point, it is desirable to calculate the distance between the landmarks by selectively using the predetermined number of landmarks contained in the extracted landmarks, than calculating for all combinations (pairs) that select two among all of the extracted landmarks. Although the detail will be described later, in the present embodiment, new landmarks are sequentially added to each of the pairs of two landmarks to increase the points to make a group of three landmarks, group of four landmarks and so on, so that the coordination between the reference image and the target image will be performed. Therefore, the number of calculation required for the process of increasing points will be approximately the value of product of the number of landmark pairs that was set in the beginning, and the number of landmarks provided for the process. For example, when about 100 landmark pairs are considered for about 100 landmarks, then about 10000 calculations will be performed. In addition, as adding new landmarks, the number of calculation will be gradually reduced. Therefore, by selecting a predetermined number (e.g., 100) of landmarks within the extracted landmarks for the process, the desired process can be performed within a realistic process time.

Furthermore, in a normal image alignment method, even when there is a deformation, it is not significant. Even if the deformation looks large, locally it is often considered to be a small deformation. Moreover, it is considered that, generally, the size of the site of the subject itself does not increase or decrease significantly within few months or few years except in a special case, e.g. when the subject is a child.

On the other hand, the image alignment may require a parallel shift and rotation of large displacement. When searching for the coordination of points (landmarks) using the coordinate value itself of the point as in a conventional way, the parallel shift and rotation must be repeated in order to evaluate the corresponding relationships, resulting in an increase of process time.

In the present embodiment, the process time will be reduced by evaluating the corresponding relationship between the landmarks of the reference image and the target image using the distance between two points or the angle formed by multiple points, without considering the parallel shift and rotation. This is utilizing the fact that the distance and the angle are invariable to the parallel shift and rotation. In addition, since the angle is invariable to the size change (enlargement or contraction) also, it can be applied preferably to a case in which the site size of the subject changes.

Landmark-Coordinating Part

The landmark-coordinating part 4 performs the process of coordinating(paring) between the landmarks of the reference image and the target image based on the positional relationship information generated by the positional relationship information-generating part 3, and it functions as an example of "coordinating part" of the present invention.

Figure 3:
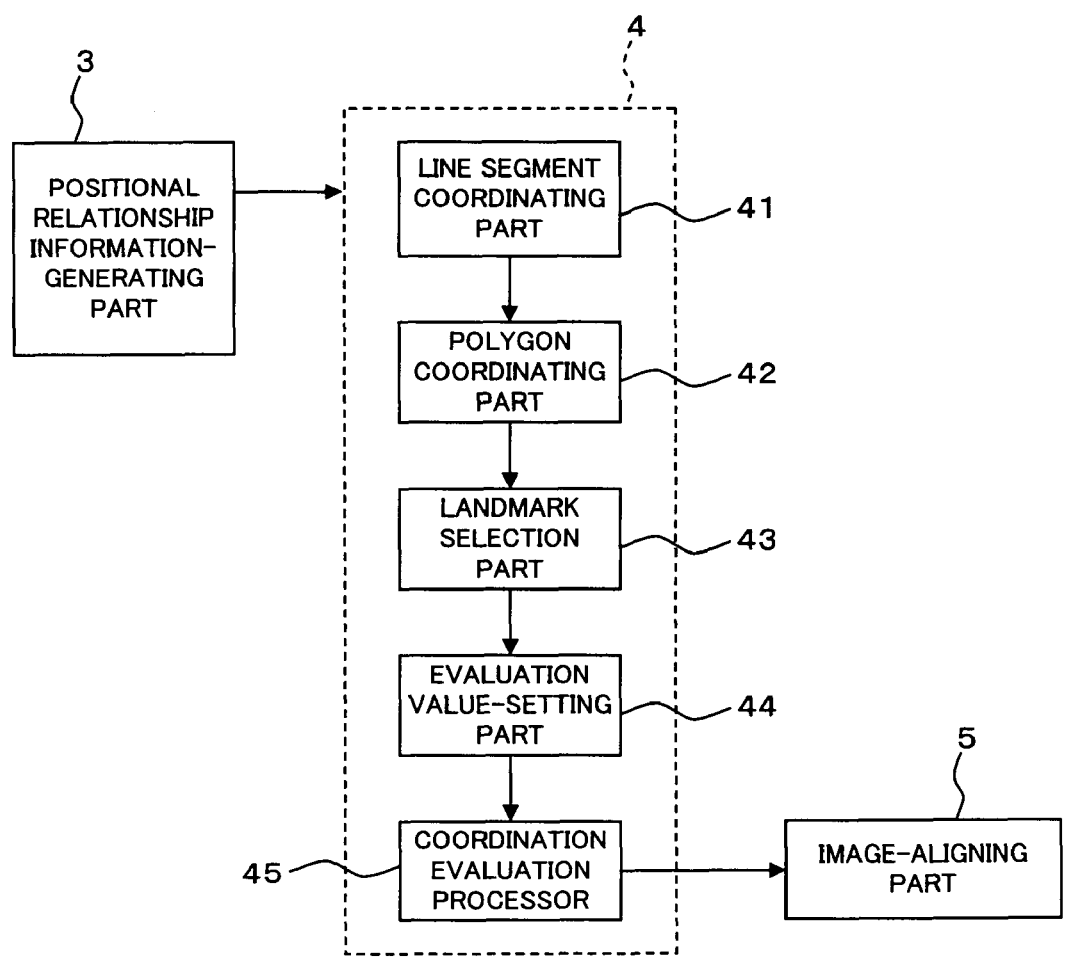
FIG. 3 is a schematic block diagram showing an example of a composition of the landmark-coordinating part of an embodiment of the medical image-processing apparatus related to the present invention.
Figure 4:
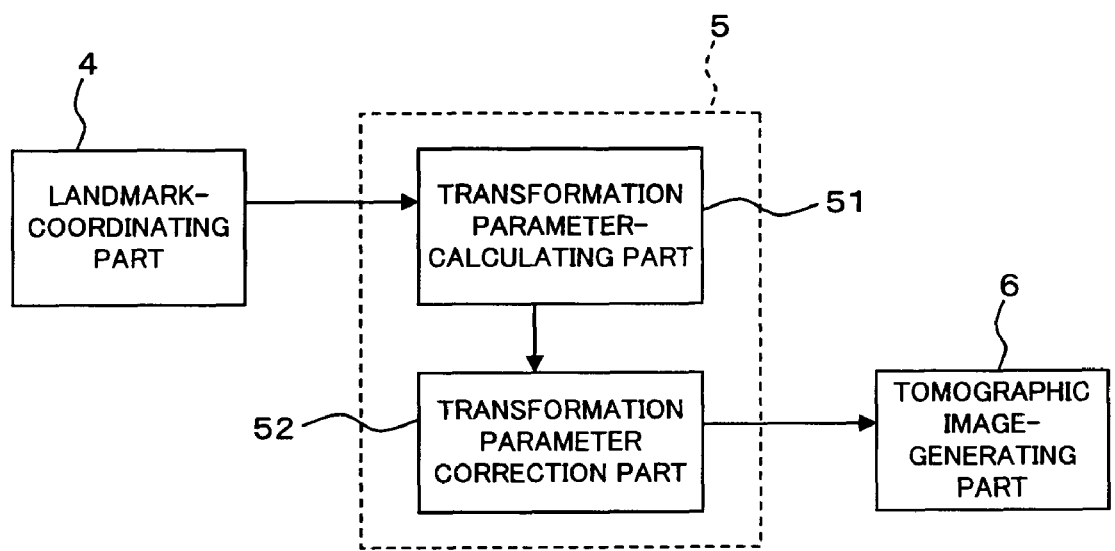
FIG. 4 is a schematic block diagram showing an example of a composition of the image-aligning part of an embodiment of the medical image-processing apparatus related to the present invention.

As shown in the FIG. 3, the landmark-coordinating part 4 comprises the line segment coordinating part 41, the polygon coordinating part 42, the landmark selection part 43, the evaluation value-setting part 44 and the coordination evaluation processor 45. The processes performed by each of these parts 41-45 will be described later.

The landmarks of the reference image will be expressed by ri(i=1–M), and the landmarks of the target image will be expressed by tj(j=1–N). These landmarks will be provided (selectively) for the process (previously described). In addition, the numbers of landmarks for these images (M and N) may be the same, or may be different.

The landmark-coordinating part 4 calculates the evaluated value fij that indicates the degree (possibility) of coordination between the landmarks ri and tj (will be described later), and determines whether these landmarks ri and tj correspond each other by performing, for example, the following evaluation process (Steps 1-3). This evaluation process is performed by the coordination evaluation processor 45.

Step 1

Fix i=i0. Calculate the sum Si0 of evaluated value fi0j for j=1–N. Determine whether there are any j=J0 having evaluated value fi0j0 that exceeds the product of the predetermined constant Cf and the sum Si0 (in other words, determine whether there are any j0 that is fi0j0>Cf×Si0).

Step 2

Fix j=j0. Calculate the sum Sj0 of evaluated value fij0 for i=1–M. Determine whether there are any i=i1 having evaluated value fi1j0 that exceeds the product of the predetermined constant Cf and the sum Sj0 (in other words, determine whether there are any i1 that is fi1j0>Cf×Sj0).

Step 3

When it was determined that the j0, which is fi0j0>Cf×Si0, exists in Step 1, as well as that the i1, which is fi1j0>Cf×Sj0, exists in Step 2, determine whether the i0 and i1 are the same. When i0≠i1, the landmark ri0 of the reference image is determined to be correspond to the landmark tj0 of the target image, therefore, a coordination is created between them. On the other hand, it is determined that these landmarks do not correspond when i0≠i1.

In addition, by having the constant Cf>0.5 for example, cases of two or more landmarks tj corresponding to one landmark ri or the opposite cases can eliminate.

Moreover, the duplication of coordination can also be eliminated by the following process. First, among the landmarks tj that correspond to one landmark ri0, the landmark with the highest evaluated value fi0j is called tj0. Similarly, among the landmarks tj that correspond to one landmark tj0, the landmark with the highest evaluated value fij0 is called ri1. Then, determine whether i0=i1. When i0=i1, it is determined to be that the landmark i0 of the reference image corresponds to the landmark j0 of the target image.

As described above, once the evaluated value fij has been configured, the coordination between the landmarks can be performed easily. Hereinafter, an example of configuration method of the evaluated value fij will be described. The configuration process of the evaluated value goes through process of coordinating between landmark pairs (line segment)→process of coordinating of polygons→process of selecting landmarks→process of setting evaluated value.

Coordination Process for Landmark Pairs

The process of coordinating between landmark pairs (line segment) is performed by the line segment coordinating part 41 as indicated in the FIG. 3. The line segment coordinating part 41 compares the distance between the landmark pairs of the reference image and the distance between the landmark pairs of the target image based on the distance list generated by the positional relationship information-generating part 3, and calculates the difference between those distances. Then, it creates tentative coordination between the landmark pairs with the difference of distance that is less than the predetermined value.

For example, when the distance between the landmark pairs <ri1, ri2> indicated in the distance list of the reference image is Dr(ri1, ri2) and the distance between the landmark pairs <tj1, tj2> indicated in the distance list of the target image is Dt(tj1, tj2), the line segment coordinating part 41 calculates the difference ΔD=|Dr(ri1, ri2)−Dt(tj1, tj2)| between the distance Dr(ri1, ri2) and Dt(tj1, tj2). Moreover, it determines whether the difference of distance ΔD is the predetermined constant Cd2 or less. When ΔD<Cd2, the line segment coordinating part 41 coordinates the landmark pairs <ri1, ri2> of the reference image and the landmark pairs <tj1, tj2> of the target image tentatively.

Here, a pair formed by two landmarks is expressed by <•, •> (similar expression will be used for the group of three or more landmarks, which will be described later.)

In addition, it is desirable that the above-described coordination process is performed only on the predetermined number of pairs having the shortest distance Dr(ri1, ri2) among the pairs (line segment) contained in the distance list of the reference image, and the predetermined number of pairs having the shortest distance Dt(tj1, tj2) among the pairs (line segment) contained in the distance list of the target image (to avoid increasing the process time). Moreover, duplicated coordination can be created in this coordination process. For example, to one pair of landmarks of the reference image can be coordinated to two or more pairs of landmarks of the target image.

Polygon Coordination Process

The process of coordinating between polygons (group of three or more landmarks) is performed by the polygon coordinating part 42. For each of the landmark pairs of the reference image and the target image that have been coordinated by the coordinating part 41, the polygon coordinating part 42 forms a (tentative) group of three (or more) landmarks by adding landmarks that are not contained in those pairs.

This process will be described more specifically. First, the polygon coordinating part 42 calculates the distance Dr(ri1, ri3) and Dr(ri2, ri3) between each landmark ri1 and ri2 of the landmark pair <ri1, ri2> of the reference image and the other landmark ri3(i3≠i1, i2) in the reference image. Similarly, it calculates the distance Dt(tj1, tj3) and Dt(tj2, tj3) between each landmark tj1 and tj2 of the landmark pair <tj1, tj2> of the target image and other landmark tj3(j3≠j1, j2) in the target image.

Next, the polygon coordinating part 42 determines whether the difference of distance is the predetermined value Cd3 or less between the length of three sides Dr(ri1, ri2), Dr(ri1, ri3), Dr(ri2, ri3) of the triangle formed by the three landmarks <ri1, ri2, ri3> in the (tentative) group of the reference image, and the length of three sides Dt(ti1, ti2), Dt(tj1, tj3), Dt(tj2, tj3) of the triangle formed by the three landmarks <tj1, tj2, tj3> in the (tentative) group of the target image.

This process is performed by, for example, determining whether the differences of distance of all combinations are the predetermined value Cd3 or less between the distances Dr(ri1, ri2), Dr(ri1, ri3), Dr(ri2, ri3) of the reference image side and the distances Dt(ti1, ti2), Dt(tj1, tj3), Dt(tj2, tj3) of the target image side. In other words, it determines whether the following formula is true:

$$\text{Max } \{|Dr(ri1,ri2)-Dt(tj1,tj2)|,$$
$$|Dr(ri1,ri2)-Dt(tj1,tj3)|,$$
$$|Dr(ri1,ri2)-Dt(tj2,tj3)|,$$
$$|Dr(ri1,ri3)-Dt(ti1,ti2)|,$$
$$|Dr(ri1,ri3)-Dt(tj1,tj3)|,$$
$$|Dr(ri1,ri3)-Dt(tj2,tj3)|,$$
$$|Dr(ri2,ri3)-Dt(ti1,ti2)|,$$
$$|Dr(ri2,ri3)-Dt(tj1,tj3)|,$$
$$|Dr(ri2,ri3)-Dt(tj2,tj3)|\} \leq Cd3$$

The max {•} here indicates a calculation selecting the maximum value of the multiple values in parentheses. When this formula is satisfied, it indicates that the difference between the length of an arbitrary side of the triangle of the reference image side and the length of an arbitrary side of the triangle of the target image side is the predetermined value Cd3 or less. This is the same as that the distance between the distance between two arbitrary landmarks among the group of three landmarks <ri1, ri2, ri3> of the reference image side and the distance between two arbitrary landmarks among the group of three landmarks <tj1, tj2, tj3> of the target image side is the predetermined value Cd3 or less.

The polygon coordinating part 42 searches for such group of landmarks <ri1, ri2, ri3> of the reference image and the group of landmarks <tj1, tj2, tj3> of the target image, and coordinates the groups of landmarks (triangle) that forms a pair.

Similarly, the polygon coordinating part 42 adds landmark ri4, tj4 respectively to the coordinated triangle pairs <ri1, ri2, ri3>, <tj1, tj2, tj3> to form groups of four landmarks (quadrangle)<ri1, ri2, ri3, ri4>, <tj1, tj2, tj3, tj4>. Furthermore, it determines whether the difference is the predetermined value Cd4 or less between the length of an arbitrary side of the quadrangle of the reference image side and the length of an arbitrary side of the quadrangle of the target image side. Then, it searches for the quadrangle pairs that satisfy the criterion and coordinates them.

Such process is repeated until it coordinates the groups of L landmarks (L-angle). The L here is an arbitrary integer of three or higher. However, it is not desirable to use large numbers for L in view of the process time. In practical use, L=3, 4, 5 is often sufficient.

Landmark Selection Process

The landmark selection part 43 performs the process of selecting (pair of groups of) landmarks to be provided for the calculation of evaluated value fij, based on the L-angle pairs of the reference image side and the target image side that have been coordinated with each other by the polygon coordinating part 42. For that purpose, the landmark selection part 43 performs, for example, the following process (Steps 1-4) to select landmarks that are suitable for calculating the evaluated value fij.

Step 1

First, calculate the length of line segment formed by connecting two apexes (in other words, distance between two landmarks) for each of the L-angles of the reference image side and the target image side. This calculation process is performed for all combination of L landmarks that forms L-angle (all combination of selecting two among L).

As a specific example of this process, when the quadrangle <ri1, ri2, ri3, ri4> of the reference image side is coordinated to the quadrangle <tj1, tj2, tj3, tj4> of the target image side will be described. The landmark selection part 43 calculates the distances Dr(ri1, ri2), Dr(ri1, ri3), Dr(ri1, ri4), Dr(ri2, ri3), Dr(ri2, ri4) and Dr(ri3, ri4) respectively for the quadrangle <ri1, ri2, ri3, ri4> of the reference image side. Then, it calculates the distances Dt(ti1, ti2), Dt(tj1, tj3), Dt(tj1, tj4), Dt(tj2, tj3), Dt(tj2, tj4) and Dt(tj3, tj4) for the quadrangle <tj1, tj2, tj3, tj4> of the target image side. In addition, there is no need to recalculate the distances that have been already calculated, such as Dr(ri1, ri2), Dr(ri1, ri3), Dr(ri2, ri3), Dt(ti1, ti2), Dt(tj1, tj3) and Dt(tj2, tj3), and the previous calculation result can be referenced.

Step 2

Next, determine whether the predetermined value Cdf is exceeded by the difference between the distance between the landmarks that form the L-angle (length of line segment) of the reference image side and the distance between the landmarks that form the L-angle (length of line segment) of the target image side obtained in Step 1. This process is performed, for example, on all combinations between the line segments of the reference image side and the line segments of the target image side.

Add one score to each landmark on both ends of the line segments determined to have a distance exceeding the predetermined value Cdf. This process can be performed by, for example, providing a counter for each of the L landmarks that form an L-angle, and incrementing the value of the counter by one when the length of the line segment whose landmarks are the end points exceeds the predetermined value Cdf.

Through this process, those landmarks among the landmarks of the reference image and the landmarks of the target image, which do not have good coordination to the other side of the image will be given a large score.

Step 3

Next, perform the process of eliminating some of the landmarks to which a high score was given in Step 2. At this point, it may set the threshold value of the score in advance, and configure the system to eliminate the landmarks having the score higher than the threshold value. Moreover, the number of landmarks to be eliminated can be set in advance, and the system may be configured to eliminate said number of landmarks with a high score in decreasing order. After this process, the remained landmarks among the landmarks of the reference image and the landmarks of the target image are the landmarks having a good coordination with the landmarks of the other side of image.

Step 4

Next, perform the same process of step 2 and 3 on the landmarks that remained after Step 3. At this time, set the predetermined value Cdf', which becomes the criterion for elimination, to a smaller value than the predetermined value Cdf in Step 2. Repeat this process, for example, until all scores of the remained landmarks becomes 0.

With that, the difference of distance becomes the predetermined value or less, the distance being between an arbitrary line segment formed by all of the remained landmarks in the reference image side and an arbitrary line segment formed by all of the remained landmarks in the target image side. In other words, only the landmarks having extremely good corresponding relationship to the landmarks of the other image will be remained.

In addition, it is not necessary to perform the elimination of landmarks until the scores of all landmarks become 0, and it is generally sufficient to leave only the landmarks with the given score that is within the predetermined range. It is preferable to set 0 as the lower limit for the predetermined range here, and it is not desirable to use large numbers as the upper limit (because the landmarks that do not have good corresponding relation with the other image will be remained).

The landmark selection part 43 selects landmarks for the calculation of evaluated value fij through the above-described processes (Steps 1-4).

Evaluated Value-Setting Process

The evaluated value-setting part 44 proceeds to set the evaluated value fij that indicates the degree (possibility) of coordination between the landmarks of the reference image and the landmarks of the target image, based on the landmarks selected by the landmark selection part 43.

The evaluated value fij can be set with the number of the landmarks that remained in the reference image side and the target image side after the elimination process by the landmark selection part 43.

The coordination evaluation processor 45 determines whether each of the landmark ri of the reference image corresponds to each of the landmark tj of the target image, by using the evaluated value fij set by the evaluated value-setting part 44 (this determination process has been already specifically described).

In addition, coordination can be made using the pairs of landmarks selected by the landmark selection part 43 without change. In other words, the pairs, which are formed with the landmarks of the reference image and the landmarks of the target image that remained after the elimination process by the landmark selection part 43, can be used for the subsequent process as the landmarks for the final coordination, without performing the setting of the evaluated value fij or the evaluation process of coordination.

Image-Aligning Part

Based on the landmarks of the reference image and the target image that have been coordinated by the landmark-coordinating part 4, the image-aligning part 5 aligns (volume data of) the two images, and corresponds to an example of the "alignment part" of the present invention.

The image-aligning part 5 comprises the transformation parameter-calculating part 51 and the transformation parameter correction part 52. The transformation parameter-calculating part 51 performs the calculation of a coordinate transformation parameter for aligning the position of one side to the position of the other side of the reference image and the target image (volume data thereof), based on the landmarks that have been coordinated by the landmark-coordinating part 4, and functions as an example of the "transformation parameter calculation part" of the present invention.

Moreover, the transformation parameter correction part 52 performs the process of correcting the calculated transformation parameter, and functions as an example of the "transformation parameter correction part" of the present invention. Furthermore, based on the transformation parameter that was calculated by the transformation parameter-calculating part 51, the transformation parameter correction part 52 acts to calculate new landmarks by selecting few landmarks from the landmarks used in said calculation process.

Transformation Parameter-Calculating Part

In the reference image (volume data thereof), a three-dimensional coordinate system (ri, rj, rk) has been defined in advance (this three-dimensional coordinate system may be called "reference coordinate system"). Moreover, in the target image (volume data thereof), a three-dimensional coordinate system (ti, tj, tk) has been defined in advance (this three-dimensional coordinate system may be called "target coordinate system"). The transformation parameter-calculating part 51 calculates the parameter of coordinate transformation (coordinate transformation equation) that transforms the coordinates (ri, rj, rk) of the reference coordinate system to the coordinates (ti, tj, tk) of the target coordinate system.

In addition, it can be set to calculate the parameter that transforms the target coordinate system to the reference coordinate system, or it can be set to calculate the parameter that transform both of the reference coordinate system and the target coordinate system to different three-dimensional coordinate systems. In other words, the transformation parameter-calculating part 51 calculates the parameter that transforms the reference coordinate system and the target coordinate system relatively, and transfers to the same three-dimensional coordinate system.

The transformation parameter-calculating part 51 is, for example, configured to calculate the transformation parameter by using conventional linear optimization method.

As an example thereof, first, the difference ti–ri between the coordinate ri of the reference coordinate system and the coordinate ti of the target coordinate system is expressed by a parametric function such as cubic polynomial (each coefficient is not yet determined). Then, the difference tj–rj between coordinate rj of the reference coordinate system and the coordinate tj of the target coordinate system is expressed by a cubic polynomial (each coefficient is not yet determined). Then, the difference tk–rk between the coordinate rk of the reference coordinate system and the coordinate tk of the target coordinate system is expressed by a cubic polynomial (each coefficient is not yet determined). By determining the coefficient (parameter) of these cubic polynomials, the coordinate transformation equation (expressed by a cubic polynomial), which transforms the coordinate (ri, rj, rk) of the reference coordinate system to the coordinate (ti, tj, tk) of the target coordinate system, can be obtained.

An example of calculation method for coefficient of the cubic polynomial will be described. With regard to the landmark r of the reference image and the landmark t of the target image that have been coordinated by the landmark-coordinating part 4, (ri, rj, rk) is used as the coordinate by the reference coordinate system of the landmark r, and (ti, tj, tk) is used as the coordinate by the target coordinate system of the landmark t.

At this time, by the transformation of the coordinate (ri, rj, rk) of the landmark r to the coordinate (ti, tj, tk) of the landmark t, the above-described three cubic polynomials will be satisfied. Since this relationship can be true for each of the landmarks (number of landmarks is P) that have been coordinated by the landmark-coordinating part 4, 3P simultaneous linear equation can be obtained. If this simultaneous equation is expressed by matrix, its transform matrix becomes a matrix of order 3P×60.

It is widely known that the least-norm solution of the 3P simultaneous linear equations can be expressed by using said transform matrix. Moreover, each unknown quantity is an independent variable, and by assuming their standard deviation, as well as assuming the standard deviation of measurement noise, the above least-norm solution of the simultaneous equation can be obtained. With that, it is possible to obtain the parameter of the coordinate transformation (coordinate transformation equation) for aligning the position of one side to the position of the other side of the reference image and the target image (volume data thereof).

Transformation Parameter Correction Part

A certain degree of error intervenes in the landmark coordination by the landmark-coordinating part 4 and the calculation process by the transformation parameter-calculating part 51. For example, when some landmarks are placed much closed to each other, there is a possibility of creating erroneous coordination during the landmark coordination process.

In such cases, the above-described transformation parameter-calculating part 51 handles the landmarks with erroneous coordination and the other landmarks with correct coordination equally and calculates the transformation parameter, despite the fact that the erroneous landmarks has been coordinated, therefore, the accuracy in the result of the alignment of the reference image and the target image will be degraded by the effect of the erroneous correspondence.

Given this factor, in the present embodiment, the transformation parameter correction part 52 is configured to perform the correction and recalculation of transformation parameter in order to reduce or eliminate such adverse affect. With that, the high-precision alignment of images effectively using information of the landmarks having correct coordination can be realized.

Hereinafter, a specific example of such process by the transformation parameter correction part 52 will be described. Hereinafter, three specific examples will be described; however, the medical image-processing apparatus related to the present embodiment may comprise at least one of these specific examples. When it comprises 2 or more, it can be configured so that the user can select the desired process accordingly, or it can be configured to be selected automatically.

SPECIFIC EXAMPLE 1

The first specific example calculates the residual error when performing the coordinate transformation of landmarks based on the transformation parameter obtained by the transformation parameter-calculating part 51, and then removes the landmarks with the residual error that is a predetermined value or more, and calculates the transformation parameter again by using only the remaining landmarks.

An example of this process will be described in detail. The transformation parameter correction part 52 transforms the coordinate (ri, rj, rk) of each landmark r of the reference image to the coordinate (ti', tj', tk') of the target coordinate system by using the transformation parameter obtained by the transformation parameter-calculating part 51.

Next is to calculate the difference $\Delta(r, t)$ between the coordinate (ti', tj', tk') obtained by the transformation and the coordinate (ti, tj, tk) of the target coordinate system of the landmark t of the target image that has been coordinated to the landmark r. This difference $\Delta(r, t)$ can be obtained by, for example, the equation $\Delta(r, t) = \{(ti'-ti)^2 + (tj'-tj)^2 + (tk'-tk)^2\}\Delta(\frac{1}{2})$. In addition, the equation of difference $\Delta(r, t)$ is not limited by this, and may be, for example, an arbitrary equation that shows residual error of the coordinate transformation by the transformation parameter, such as difference $\Delta(r, t) = \max\{ti'-ti, tj'-tj, tk'-tk\}$.

Then, with regard to each pair r, t of landmarks, the landmark pairs that satisfy the condition $\Delta(r, t) < \delta 1$ are searched by comparing the difference $\Delta(r, t)$ and the predetermined value $\delta 1$. Then, new transformation parameter is calculated by using only the landmark pairs that satisfy the condition. This calculation process is performed similarly to the process of the transformation parameter-calculating part 51.

It is desirable to repeat such process as reducing the threshold value in the above condition. In other words, new transformation parameter is repeatedly obtained by setting the threshold value $\delta 1 > \delta 2 > \delta 3 > \ldots$ in advance, and use the as above threshold value $\delta 1$ in the first process, use the threshold value $\delta 2$ in the second process, and then use the threshold value $\delta 3$ in the third process . . . . Thus, it is possible to obtain the transformation parameter that enables the higher precision alignment.

Moreover, the above process eliminates only the landmark pairs with a large residual error; however, it is desirable to configure so that the distance list is recreated by using the coordinate after coordinate transformation, and the landmark coordination is performed again, and the inappropriately coordinated landmarks (having large error) are removed based on the result. Thus, it is possible to obtain the transformation parameter that enables the higher precision alignment. In addition, after the first landmark coordination process, it is desirable to set a smaller value for the values Cd and Cf that become the criteria for the coordination to improve accuracy of the coordination process.

SPECIFIC EXAMPLE 2

The second specific example corrects the transformation parameter by performing weighting on each of the landmark pairs using a weighted function (objective function) according to the difference $\Delta(r, t)$ that can be obtained similarly to the specific example 1.

Figure 5:
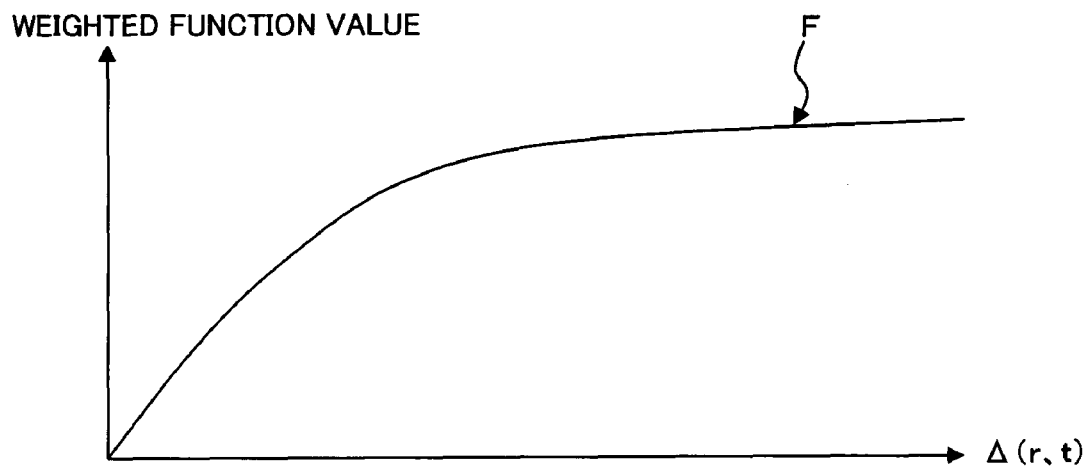
FIG. 5 is a graph for explaining an example of process by the image-aligning part of an embodiment of the medical image-processing apparatus related to the present invention.

FIG. 5 shows an example of the weighted function. The weighted function F shown in the same diagram is a nonlinear function, in which the value of gradient (slope) $F'(\Delta(r, t))$ is large when the value of difference $\Delta(r, t)$ is small (when the residual error by the transformation parameter is small), and as the value of difference $\Delta(r, t)$ becomes larger, the value of gradient $F'(\Delta(r, t))$ becomes gradually smaller. This weighted function F has, for example, gradient $F'(\Delta(r, t))=1$ when the value of difference $\Delta(r, t)$ is small.

The transformation parameter correction part 52 is a non-linear optimization method using an iterative solution technique based on the weighted function F. Although this process uses the iterative solution technique, since the weighted function F is a simple function, the calculation can be processed at high speed and will not cause increase of process time.

Moreover, this weighted function F has a large gradient $F'(\Delta(r, t))$ when the difference $\Delta(r, t)$ is small, and a small gradient $F'(\Delta(r, t))$ when the difference $\Delta(r, t)$ is large, therefore, in the process of optimization, the effect on the alignment given by the landmark pairs with small difference $\Delta(r, t)$ becomes larger, at the same time the effect of landmark pairs having a large difference $\Delta(r, t)$ becomes smaller. Particularly, when the number of landmark pairs having a large difference $\Delta(r, t)$ is sufficiently smaller than the number of landmark pairs having a small difference $\Delta(r, t)$, the effect of the landmark pairs with a large difference $\Delta(r, t)$ will be mostly ignored. As a result, even when the landmark pairs with a large difference $\Delta(r, t)$ exist, their effect on the alignment result is reduced (ignored), thus a highly accurate alignment can be possible.

In addition, the weighted function used in this specific example is not limited to the above listed and any arbitrary functions may be used. However, it is necessary to use functions that increase the effect to the alignment by the landmark pairs with small difference $\Delta(r, t)$ and reduce the effect to the alignment by the landmark pairs with large difference $\Delta(r, t)$.

SPECIFIC EXAMPLE 3

The third specific example is a modified version of the specific example 2. The characteristic of this specific example is that the weighted function (objective function) is modified in the iterating process of the non-linear optimization method using the iterative solution technique described in the specific example 2.

Figure 6:
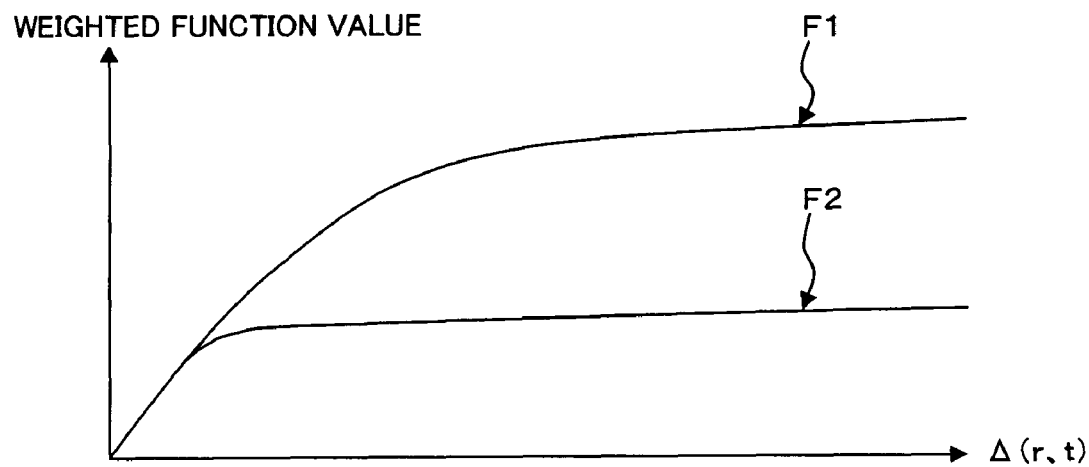
FIG. 6 is a graph for explaining an example of process by the image-aligning part of an embodiment of the medical image-processing apparatus related to the present invention.

FIG. 6 shows an example of weighted function used in this specific example. The same diagram indicates two weighted functions F1 and F2. The weighted function F1 is used during the early phase of iterating process of the non-linear optimization method using iterative solution technique, and the weighted function F2 is used during the later phase of iterating process. The weighted function F2 is set in a way that the gradient $F'\Delta(r, t)$ becomes gradually smaller with a value of difference $\Delta(r, t)$ smaller than the weighted function F1.

The transformation parameter correction part 52 is configured to perform the process using the weighted function F1 until the iteration count reached a predetermined number and when it reaches the predetermined number, it switches to the weighted function F2 and performs the process. In addition, it can be configured to calculate residual error after each iteration, and switch to the weighted function F2 when the residual error becomes the predetermined value or less.

The following merits can be obtained by applying the above configuration. When compared to the weighted function F1, the weighted function F2 acts to reduce the effect on the alignment by the landmark pairs with a somewhat smaller difference $\Delta(r, t)$ also, therefore, it seems to be able to use the weighted function F2 from the start of the iteration. However, if the weighted function F2 is used from the start, the number of landmark pairs that have larger effect on the alignment (in other words, the landmark pairs with very small difference $\Delta(r, t)$) becomes extremely small, and may cause even more error in the alignment result.

Therefore, in the early phase of iteration, the weighted function F1 is used to suitably correct the transformation parameter by using the landmark pairs (relatively large number of them exist) having a certain amount of difference $\Delta(r, t)$. Then, by switching to the weighted function F2 when the iteration count has progressed, the transformation parameter that enables a highly accurate alignment is obtained.

In addition, the two weighted functions F1 and F2 are used by switching in the example indicated by FIG. 6, but the number of weighted functions may be three or more. Moreover, it is possible to use the weighted function that changes continuously according to the iteration count.

Tomographic Image-Generating Part

The tomographic image-generating part 6 generates image data of tomographic image in the cross-section of positions, which were found to be the same by the alignment, based on the volume data of the reference image and the target image that have been aligned by the image-aligning part 5. It corresponds to an example of the "tomographic image generating part" of the present invention. In addition, the generating process of image data of tomographic image based on volume data, for example, can be performed by MPR (Multi-Planar Reconstructions).

The process of the tomographic image-generating part 6 will be described more specifically. The image-aligning part 5 aligns the reference image and the target image by performing the above-described process. For example, it coordinates the coordinate of volume data of the reference image expressed by the reference coordinate system and the coordinate of volume data of the target image expressed by the target coordinate system by the coordinate transformation by the transformation parameter.

When a slice position of the reference image is specified (previously described) using the user operation part 8, the tomographic image-generating part 6 generates image data of tomographic image of the reference image in the slice position, based on the volume data of reference image. Moreover, the tomographic image-generating part 6 calculates the slice position of the target image that corresponds to the specified slice position, based on the alignment result (transformation parameter) by the image-aligning part 5. Then, based on the volume data of target image, it generates image data of tomographic image in the calculated slice position. The image data generated for each of the reference image and the target image is sent to the display part 7.

In addition, when the medical image-processing apparatus 1 has memory of image data of tomographic image in a slice position in advance and when the slice position is specified, it can also be configured to access the image data of the tomographic image that corresponds to the specified slice position and send it to the display part 7, instead of generating image data of the tomographic image that corresponds to the specified slice position.

The display part 7 received the image data from the tomographic image-generating part 6, and displays the tomographic image of reference image and the tomographic image of target image in parallel. These tomographic images are, as described above, the tomographic images in (approximately) the same slice position based on the result of alignment by the image-aligning part 5.

Hardware Composition

The hardware composition of the medical image-processing apparatus 1 will be described. The medical image-processing apparatus 1 contains a general computer apparatus. The medical image-processing apparatus 1 comprises a microprocessor, volatile memory, nonvolatile memory, user interface and communication interface.

The microprocessor comprises such as CPU (Central process Unit) or MPU (Micro process Unit). The volatile memory comprises such as RAM (Random Access Memory).

The nonvolatile memory comprises such as ROM (Read Only Memory) or hard disk drive. A computer program, which instructs the computer apparatus to perform the above-described process, has been installed in the hard disk drive in advance. Moreover, image data of medical images or the data (medical record information, etc.) relates to patients will be stored in the hard disk drive.

The user interface comprises a display device and an operation device (input device). The display device comprises an arbitrary display device such as LCD (Liquid Crystal Display) or CRT (Cathode Ray Tube) display. The operation device comprises arbitrary devices such as mouse, keyboard, trackball, and control panel. In addition, the display device and the operation device can be integrated by using a touch panel LCD, etc.

The communication interface comprises a network adopter such as LAN card. Moreover, it can be configured to perform data communication through Internet by mounting a modem.

Each of the extraction processor 2, the positional relationship information-generating part 3, the landmark-coordinating part 4, the image-aligning part 5, and the tomographic image-generating part 6 in FIG. 1 comprises a microprocessor that performs the above computer program.

Moreover, the display part 7 comprises a display device, and the operation part 8 comprises an operation device (input device).

Furthermore, the overall control of the medical image-processing apparatus 1 for the above-described processes is performed by the microprocessor that executes the above computer program. For example, the microprocessor controls the display of various types of screens or images on the display device (display part 7). The microprocessor controls each part of the apparatus based on the operation signal (signal outputted in response to operation) from the operation device (operation part 8).

Effect

According to the above-described medical image-processing apparatus 1, mainly the following effects can be obtained.

First, the medical image-processing apparatus 1 is configured to work as follows: (1) the extraction processor 2 extracts landmarks within a image for each of the reference image and the target image; (2) the positional relationship information-generating part 3 generates a distance list (positional relationship information), which indicates the positional relationship of landmarks extracted, for each of the two sets of volume data; (3) the landmark-coordinating part 4 eliminates some of the landmarks for each of the reference image and the target image based on the generated positional relationship information, and coordinates the remaining landmarks between the reference image and the target image; (4) the image-aligning part 5 aligns the two sets of volume data based on the landmarks that have been coordinated by the landmark-coordinating part 4.

This image alignment process employs a alignment method using landmarks, instead of a conventional repetitive aligning method that requires long process time, and it does not coordinate landmarks by analyzing the positions of landmarks themselves, but it eliminates some of the landmarks based on the positional relationship (distance between the landmarks) of the landmarks indicated in the distance list, and coordinates the remaining landmarks. The distance between the landmarks is a quantity invariable to a parallel shift or rotation of image.

Figure 8A:
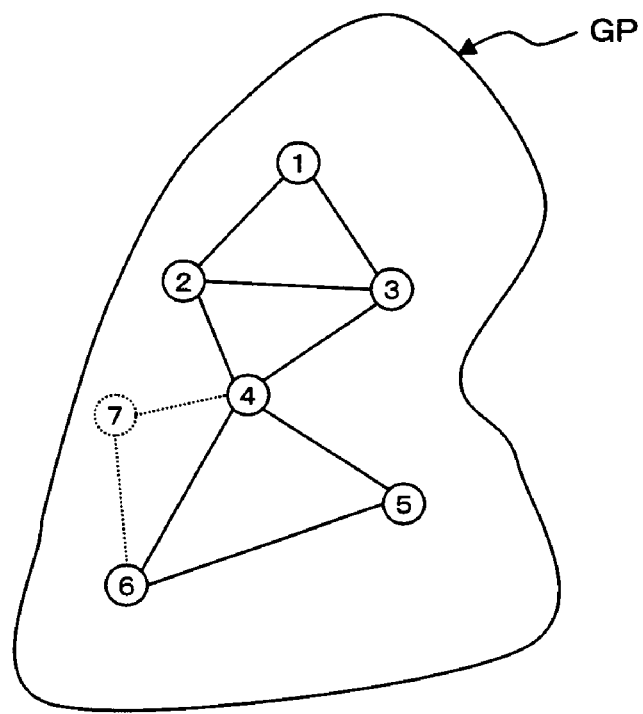
FIG. 8A and FIG. 8B are schematic diagrams for explaining the process by an embodiment of the medical image-processing apparatus related to the present invention.
Figure 8B:
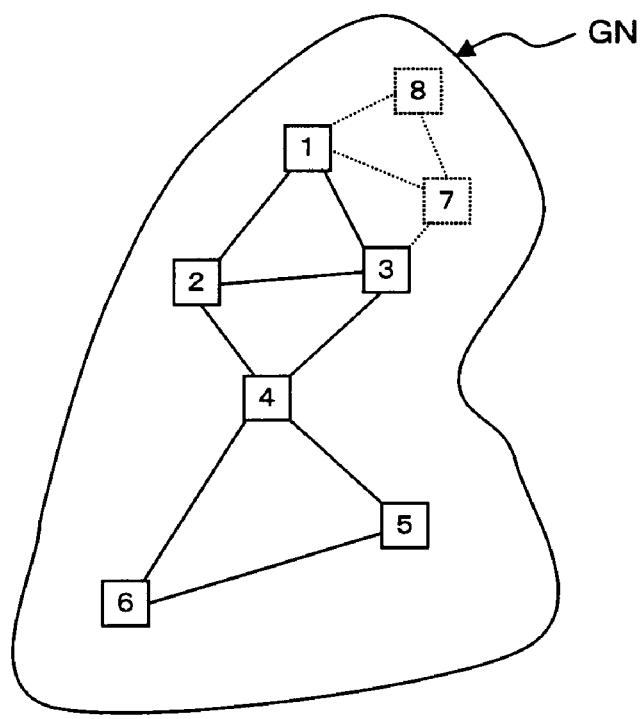

The process performed by the medical image-processing apparatus 1 will be described here by referring to FIGS. 8 and 9. The alignment between the past image GP indicated in FIG. 8(A) and the newest image GN indicated in FIG. 8(B) will be described.

First, the medical image-processing apparatus 1 extracts landmarks for each of the past image GP and the newest image GN. The numbers 1-7 inside a circle shown in FIG. 8(A) indicate the 7 landmarks extracted from the past image GP. Further, the numbers 1-8 inside a quadrangle shown in FIG. 8(B) indicate the 8 landmarks extracted from the newest image GN.

Then, the medical image-processing apparatus 1 generates the distance list that indicates the positional relationships of the landmark 1-7 of the past image GP and the landmark 1-8 of the newest image GN.

Next, the medical image-processing apparatus 1 eliminates landmarks based on the distance list. In this example, the landmark 7 of the past image GP is eliminated as well as the landmarks 7 and 8 of the newest image GN. After that, the remaining landmarks are landmarks 1-6 of the past image GP and landmarks 1-6 of the newest image GN.

Figure 9:
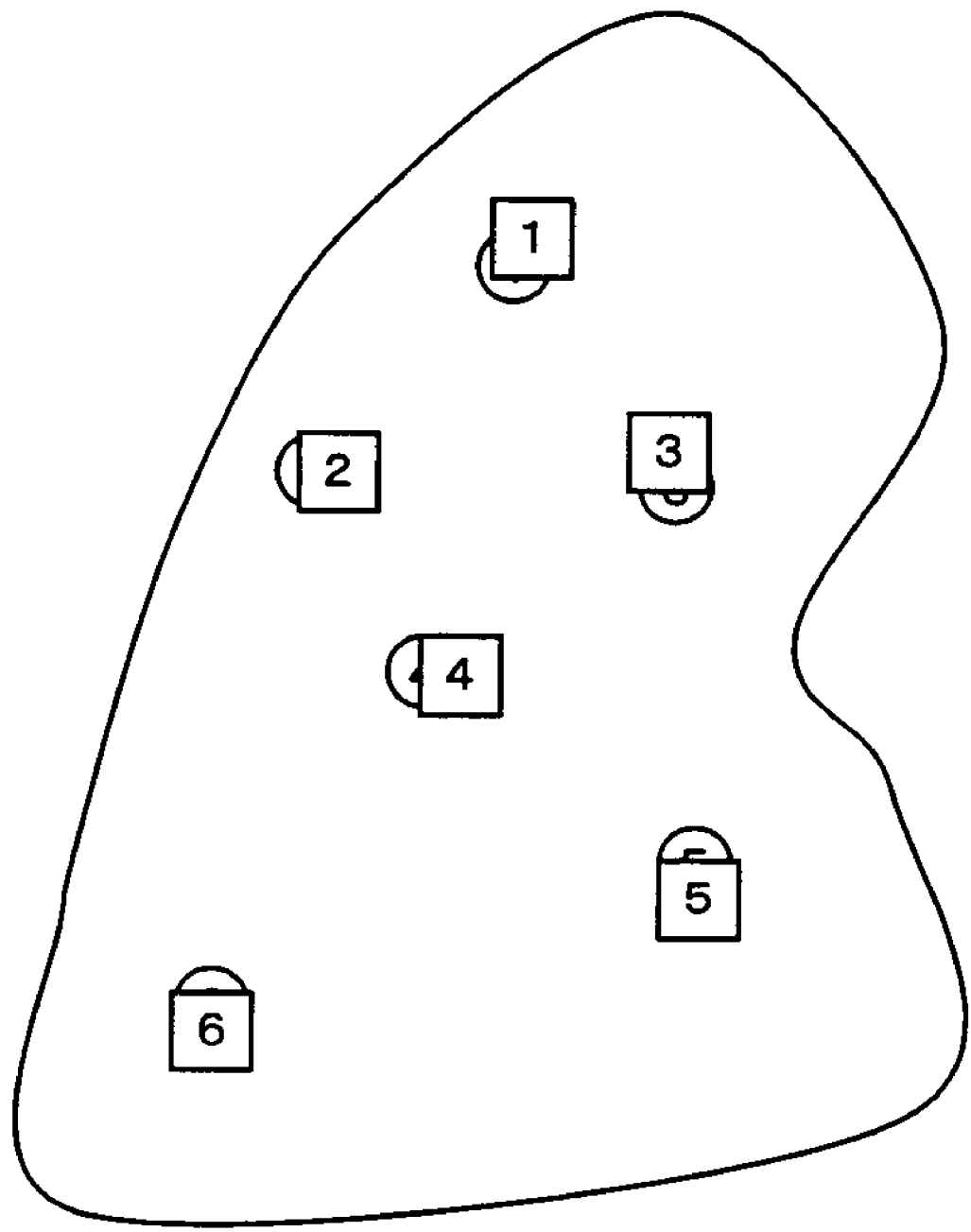
FIG. 9 is a schematic diagram for explaining the process by an embodiment of the medical image-processing apparatus related to the present invention.

FIG. 9 shows the positional relationships of the remaining landmarks of both images GP and GN. In this example, the landmarks 1, 2, . . . 6 of the past image GP will be coordinated to the landmarks 1, 2, . . . 6 of the newest image GN.

The medical image-processing apparatus 1 aligns both images GP and GN, by deciding the transformation parameter to align the positions of landmarks 1-6 of the past image GP and the positions of corresponding landmarks 1-6 of the newest image GN. In addition, the transformation parameter can be decided so that the positions of landmarks 1-6 of newest image GN are aligned to the positions of landmarks 1-6 of the past image GP.

As described above, the process time can be reduced by performing the coordination after eliminating some of the landmarks using the distance list. Particularly, by the elimination of landmarks, the alignment of images can be performed with a simple threshold process, thus the process time can be reduce. Further, since there is no need for a conventional parallel shifting or rotation of images, it is possible to reduce the process time compared to a conventional method.

Moreover, as described above, accuracy of the image alignment is also high. Even when there was an error in the extraction of landmarks, the error will be eliminated in during the landmark coordination step, therefore, the alignment of images can be performed at high speed and high degree of accuracy.

Furthermore, the medical image-processing apparatus 1 is configured to work as follows: (1) the extraction processor 2 extracts landmarks within an image for each volume data of the reference image and the target image; (2) the landmark-coordinating part 4 coordinates the landmarks extracted by the extraction processor 2 between these two medical images; (3) transformation parameter-calculating part 51 calculates a coordinate transformation parameter for the alignment of the position of one of the two sets of volume data to the position of the other set based on the landmarks coordinated by the landmark-coordinating part 4; (4) transformation parameter correction part 52 calculates the distance between the coordinated landmarks in the aligned two sets of volume data, based on the calculated parameter, and corrects the parameter according to the calculated distance; (5) the image-aligning part 5 aligns the two sets of volume data based on the corrected parameter.

According to such image alignment process, it is possible to avoid increase of process time by employing an alignment method using landmarks, as well as it is possible to align images accurately by correcting the parameter based on the distance between the landmarks and aligning the volume data of the reference image and the target image using the corrected parameter.

Moreover, the medical image-processing apparatus 1 is configured to work as follows: (1) the extraction processor 2 extracts landmarks within a image for the volume data of the reference image and the target image obtained with regard to the site of a subject having branching structure (pulmonary vessels). At this point, the extraction processor (1a) extracts an image region that corresponds to the site having branching structure, for each of the two sets of volume data, and (1b) extracts a common region between the extracted image region, and the boundary region of a partial region of image that contains at least a part of the extracted image region, for each of the two images, (1c) sets the positions within the extracted common region as seeds, (1d) using the seeds as origins, extracts landmarks in the image region that corresponds to the branch position of the site having branching structure; (2) the landmark-coordinating part 4 coordinates between landmarks extracted for the two medical images; (3) the image-aligning part 5 aligns the two sets of volume data based on the coordinated landmarks.

According to such image alignment process, the seed, which becomes origin for the extraction, can be set automatically when extracting landmarks of the site having branching structure, therefore, the increase of process time can be prevented at the same time performing image alignment with good accuracy.

MODIFIED EXAMPLES

The above-described explanation is only an example of specific composition for carrying out the present invention, and any modifications may be made accordingly.

Modified Example 1

First, as mentioned in the above embodiment, this section describes a modified example using angular list (angular information) that contains angles of polygonal apexes formed by three or more landmarks as the positional relationship information that indicates the positional relationship of landmarks that have been extracted from medical images.

This section takes up the angular list that contains angles of triangle apexes formed by three landmarks as a specific example. The positional relationship information-generating part 3 forms groups, each of which comprises three landmarks among the landmarks extracted by the landmark-extracting part 23. More specifically, it first selects two landmarks that has a short distance between each other and forms a pair. At this time, it may form pairs in order from the shortest distance, or it may form pairs having a distance that is the predetermined value or less. Next, the positional relationship information-generating part 3 forms a group of three landmarks by adding a new landmark to the pair, in similar manner to the polygon coordinating part 42 in the above embodiment.

It is followed by the calculation of angle of apex of triangle formed by the three landmarks for each groups by the positional relationship information-generating part 3. Then, the information that differentiates each landmark (or information that differentiates each group) and the calculated angles are associated to create angular lists for each of the reference image and the target image.

Next, the coordination of landmarks using the angular list will be described. The triangle (group of three landmarks) of the reference image side will be expressed as <ri1, ri2, ri3> and the triangle of the target image side will be expressed as <tj1, tj2, tj3>. Further, the angle of apex ri1 of the triangle <ri1, ri2, ri3> will be expressed as θr(ri1), the angle of apex ri2 as θr(ri2) and the angle of apex ri3 as θr(ri3). Moreover, the angle of apex tj1 of the triangle <tj1, tj2, tj3> will be expressed as θt(tj1), the angle of apex tj2 as θt(tj2) and the angle of apex tj3 as θt(tj3).

The landmark-coordinating part 4 determines whether the difference between the angles θr(ri1), θr(ri2), θr(ri3) of the reference image side and the angles θt(tj1), θt(tj2), θt(tj3) of the target image side is the predetermined value or less, and then it coordinates triangles that have the difference of the predetermined value or less (in other words, it performs coordination by eliminating triangles that has said difference that exceeds the predetermined value). At this point, it calculates the difference of angle for all combinations of angles in both images, and determines if the angular difference of all combinations becomes the predetermined value or less.

At this point, L-angle is formed by adding landmark(s) according to needs and the determination process similar to the above is performed on the apex of the L-angles, and then they are coordinated. The following process is same as the above embodiment.

Modified Example 2

The above embodiment performed alignment of two medical images having branching points of bronchial tube and pulmonary vessels as landmarks, but, this modified example will describe a method of determining landmarks using the shape of boundary area (contour) of lung.

Figure 10:
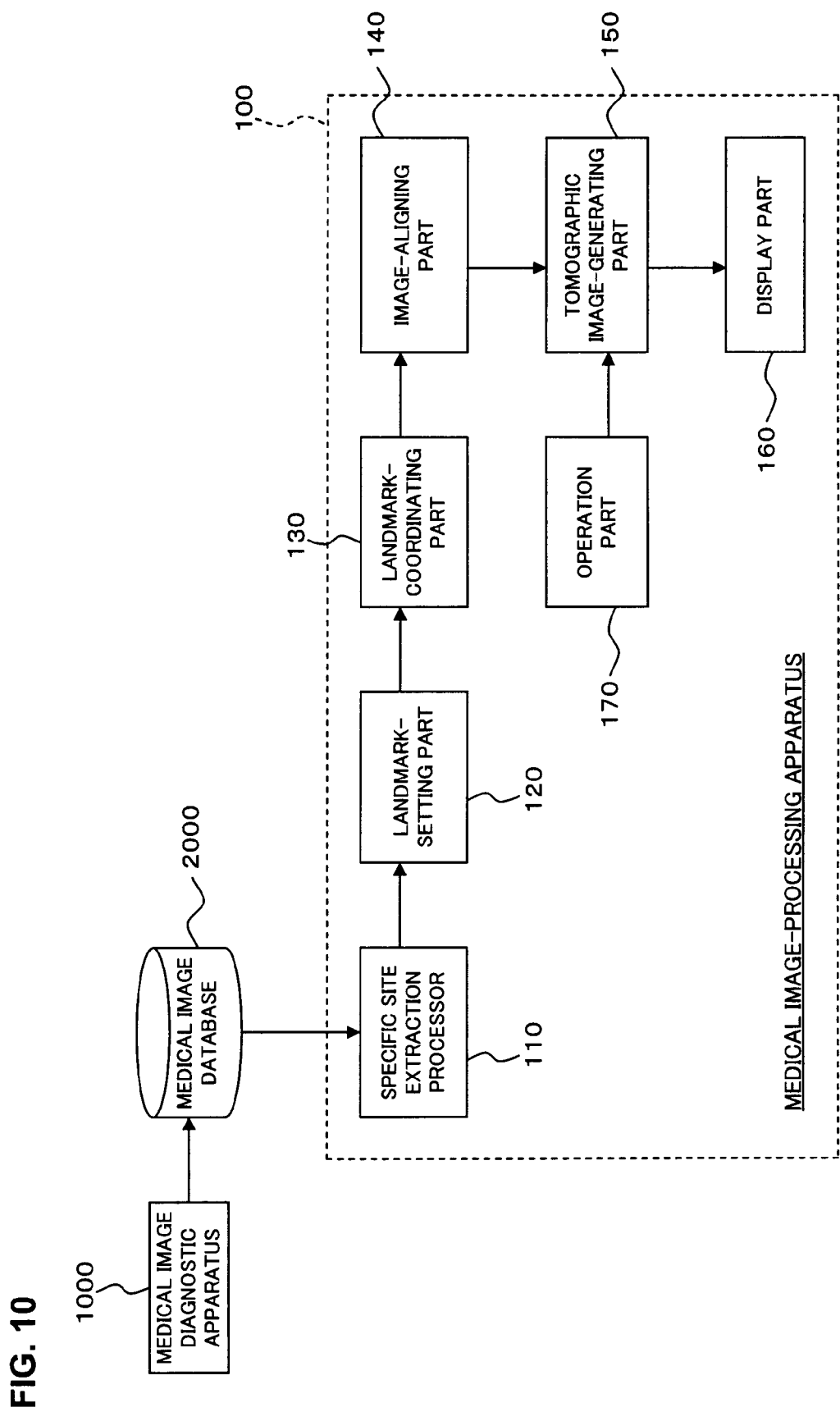
FIG. 10 is a schematic block diagram showing an example of the overall composition of a modified example of the medical image-processing apparatus related to the present invention.

FIG. 10 indicates an example of composition of the medical image-processing apparatus related to this modified example. The medical image-processing apparatus 100 indicated in the same diagram comprises the specific site extraction processor 110, the landmark-setting part 120, the landmark-coordinating part 130, the image-aligning part 140, the tomographic image-generating part 150, the display part 160, and the operation part 170. Each of the tomographic image-generating part 150, the display part 160 and the operation part 170 has similar composition as the tomographic image-generating part 6, the display part 7 and the operation part 8 of the above embodiment respectively.

Specific Site Extraction Processor

The specific site extraction processor 110 extracts image region that corresponds to a specific site of the subject for each of the reference image and the target image, and functions as an example of "specific site extraction part" of the present invention. The specific site extraction processor 110 extracts an image region corresponds to the lung of the subject as a specific site. In addition, in this modified example, there is no need to extract small convexo-concave of hilar area in detail, and an extraction of boundary shape (contour shape) of lung will be sufficient.

For that purpose, the specific site extraction processor 110 first extracts, for example, a image region, −400 HU or less, by performing a threshold process on the medical image (the reference image and the target image) containing image region of lung. Next, it adds label (identification data) to each connected region (connected component) of the extracted image region by using known method (such as connected component labeling).

Then, it counts the number of voxels in each connected region, and selects the connected region that has the maximum number of voxels among the connected region that do not contain any of the 8 corners of volume data of the medical images. The connected regions that contain one of the 8 corners of volume data are eliminated here to avoid selecting an atmosphere region when the atmosphere region outside the subject's body has the maximum voxel count. From the above, the region (voxel thereof) that corresponds to lung is extracted from the medical image (volume data thereof).

Landmark-Setting Part

The landmark-setting part 120 sets landmarks in the specific site based on the image region that corresponds to the specific site that was extracted by the specific site extraction processor 110, and functions as an example of "landmark setting part" of the present invention.

The landmark-setting part 120 works to set the landmarks in the top position, left position, right position, front position and rear position of the image region (lung region) that have been extracted as a specific site that corresponds to the lung. In addition, in the present invention, it is sufficient when landmarks are set in at least one of the above positions. Hereinafter, the setting process of landmarks in these positions will be described.

First, the setting process of landmarks in the top position will be described. The landmark-setting part 120 detects side part position of the extracted lung region to set landmark in top position. The side part position means the position of the left end position of left lung/right end position of right lung. Since this process is to set landmarks in the top position of both lungs, both of the left end position of left lung and the right end position of right lung will be detected.

The detection of the left end position of left lung is performed by, for example, searching for the maximum horizontal coordinate value (or the minimum: depending on the direction of horizontal coordinate axis) among the voxels of the image region (left lung region) that corresponds to the extracted left lung. The extraction of the right end position of right lung will be conducted similarly.

Next, the landmark-setting part 120 detects the position that corresponds to the apical portion of the lung by following inside the lung region upward (head direction) with the extracted side part position as the starting point. An example of extracting the position of apical portion of left lung will be described in detail. First, it determines whether the voxel that is one above (head direction) the voxel of the detected left end position of left lung is contained in the left lung region. If it is contained, then it determines whether the voxel that is one further above is contained in the left lung region. Meanwhile, when the one above voxel is not contained in the left lung region, it determined whether the voxel that is one to the right is contained in the left lung region. It repeats such determination process until no voxel of the top and right direction is contained in the left lung region. With that, the position that corresponds to the apical portion of the lung of left lung will be detected.

Then, the landmark-setting part 120 sets the landmarks of the top position to the position that is lower by a predetermined distance from the position that corresponds to the detected apical portion of the lung. As for the predetermined distance, for example, it can use the distance from the apical portion of the lung to the top slice position so that the area of slice surface in the anteroposterior and horizontal direction becomes the predetermined value (such as 700 square millimeter) or more. As an acquisition method of the slice position, for example, the area of slice surface is calculated with a predetermined interval from the position of apical portion of the lung toward below, and the position where the area first became the predetermined value or more is set to be the slice position.

The landmark-setting part 120 sets the landmarks of the top position to, for example, the barycentric position of the cross-section of lung in the slice position (set for each of the left and right lungs). These landmarks may be called landmarks under apical portion of lung.

In addition, it can also be considered to detect the apical portion of the lung by analyzing the image region that corresponds to lung from the top (head direction) toward the bottom (leg direction). However, since trachea is extracted together by the extraction process of the specific site extraction processor 110 and the trachea will be detected before it reaches the apical portion of the lung, thus the extraction of apical portion of the lung may not be performed effectively. Such case will be avoided in this modified example, since the apical portion of the lung is extracted by following the lung region upward from the side part position as described above.

Next, the setting process of the landmarks of the left position and right position will be described. For that purpose, the landmark-setting part 120 detects the lower end positions of the left and right lung. The lower end position can be obtained by searching for the voxel that is in the lower end position by referring to each voxels of the left lung region and right lung region. In addition, the landmarks (landmarks in the bottom position) may be set in the lower end position.

The landmark-setting part 120 obtains the slice position that internally divides the position of landmarks below apical portion (slice position thereof) and the position of the lower end by a predetermined ratio (e.g., 8:2). Then, in the slice position, the left end position of left lung region and the right end position of right lung region are detected. This detection process is performed by referring to the coordinate of voxels in the left lung region and right lung region in the slice position.

Furthermore, the landmark-setting part 120 sets the landmarks in the left position and the landmarks in the right position based on the detected left end position of left lung and the right end position of right lung. These landmarks can be set by any method based on the left end position of left lung and the right end position of right lung. For example, as for the horizontal positions of these landmarks, they can be set on the left side line and the right side line among the three lines (or surfaces), which divide the lung region horizontally into four regions. Moreover, setting can be performed similarly for the positions of anteroposterior direction (e.g., setting can be performed on the line or surface that divides the lung region in two pieces in anteroposterior direction).

Finally, the setting process of landmarks in front position and rear position will be described. These landmarks are set based on the landmark of left position and the landmarks of right position. For this, the landmark-setting part 120 detects the front-end position and the rear end position in the above-described slice position in the internal division position. Then, it sets the landmarks of front position and the landmarks of the rear position based on the set landmarks of the left position and the right position and the front-end position and the rear end position of the slice position. This setting method can be any method. For example, obtain the center of the left and right landmarks, and consider the straight line that is perpendicular to the left-right direction and that extends in an anterior direction from the center. Then, set the front position landmarks in the position that progresses by half the length of the anteroposterior direction of the lung from the center along the straight line. The rear position landmarks can be set similarly.

Landmark-Coordinating Part

Landmark coordination by the landmark-coordinating part 130 is easy. In other words, in this modified example, each landmark has been given a meaning (top position, right position, left position, front position and rear position). The name is given for each of landmark when setting landmarks by giving identification data such as flags during the setting. The landmark-coordinating part 130 coordinates between the landmarks of the reference image and the landmarks of the target image according to the names (e.g., coordinates between the landmarks of top position of left lungs). In addition, the coordination can be performed after eliminating some of the landmarks as was done in the above embodiment and using the remaining landmarks.

Image-Aligning Part

For the landmark pairs that have been coordinated by the landmark-coordinating part 130, the image-aligning part 140 calculates, for example, transformation parameter that transforms the coordinate (coordinate of the reference coordinate system) of landmark of the reference image side to the coordinate (coordinate of the target coordinate system) of landmark of the target image. A publicly known method can be used for this calculation.

According to this modified example, the alignment of images can be performed in a short amount process time by using the alignment method that uses landmarks and gives a name for each of the landmarks, instead of using the conventional repetitive alignment method that requires long process time. Furthermore, since the number of landmarks for consideration is extremely small, thus images can be aligned in a very short time. Furthermore, since it coordinates between the landmarks having names, so there is no error in the coordination, thus the alignment can be performed at high level of accuracy.

Medical Image-Processing Method

The method for processing medical images related to the present invention will be described. The medical image-processing apparatus in the above embodiment is an example of apparatus to execute the method for processing medical images.

The first method for processing medical images related to the present invention aligns two sets of volume data of medical images, and comprises process of: (1) setting landmarks of medical images based on each set of volume data; (2) generating positional relationship information indicating positional relationship of the landmarks for each set of the volume data; (3) coordinating between landmarks of two medical image that remained after eliminating some of the landmarks based on the positional relationship information; (4) aligning the two sets of volume data based on the coordination of landmarks.

According to such method for processing medical images, it is possible to reduce the process time as well as performing the alignment of images at high degree of accuracy as described above.

The second method for process medical images related to the present invention aligns two sets of volume data of medical images, and comprises process of: (1) setting landmarks of medical image based on each set of volume data; (2) coordinating between the landmarks of the two medical images; (3) calculating coordinate transformation parameter for aligning the position of one set of the volume data to the position of the other set of volume data based on the coordination of landmarks; (4) calculating distance between the coordinated landmarks after the alignment based on the parameter; (5) correcting the parameter according to the distance; (6) aligning the two sets of volume data based on the corrected parameter.

According to such method for processing medical images, increase of process time can be avoided by using landmarks. Moreover, since the image alignment is performed by using parameter that have been corrected based on the distance between the landmarks parameter, thus the alignment of images can be performed at high level of accuracy.

The third method for processing medical images related to the present invention aligns two sets of volume data of medical images, and comprises process of: (1) extracting image region that corresponds to the right and left lungs of a subject for each medical image; (2) detecting the position of apical portion and the position of the lower end of each lung in the image region; (3)_detecting the left end position of the left lung image region and the right end position of the right lung image region in the cross-section position, which internally divides the position of apical portion and the position of the lower end in the image region by a predetermined ratio; (4) setting the landmarks of each medical image based on the position of the apical portion, the position of the lower end, the position of the left end and the position of the right end; (5) coordinating the landmarks of two medical images; (6) aligning two sets of volume data based on the coordination of landmarks.

According to such method for process medical images, the alignment of images can be performed in a short process time by using landmarks as well as giving a name for each of the landmarks. Furthermore, since the number of landmarks for consideration is extremely small, thus images can be aligned in a very short time. Furthermore, since it coordinates between the landmarks having names, so there is no error in the coordination, thus the alignment can be performed with high level of accuracy.

What is claimed is:

1. A medical image-processing apparatus that aligns volume data of two medical images, comprising:
 a setting part configured to set landmarks of medical images based on each set of volume data;
 a generating part configured to generate positional relationship information that indicates the positional relationships of said landmarks with regard to each set of volume data;
 a coordinating part configured to coordinate between the landmarks of two medical images that remain after eliminating some of the landmarks based on said positional relationship information; and an alignment part configured to align two sets of volume data based on said coordination of landmarks, wherein said generating part executes the processes of:
forming multiple pairs, each of which comprises two landmarks of the same medical image based on the landmarks set by said setting part;
calculating the distance between landmarks for each of said multiple pairs; and
generating distance information containing said distances as positional relationship information; and wherein said coordinating part executes the processes of:
tentatively coordinating the pairs that have a difference in distance that is a predetermined value or less by comparing the distance between a pair of landmarks of one of the medical images and the distance between a pair of landmarks of the other medical image based on the distance information;
forming a group of three or more landmarks for each of the tentative pairs by adding a landmark that is not contained in the pairs;
calculating an evaluated value indicating the degree of coordination of said group in the two medical images, based on the distance between the two landmarks contained in the group; and
coordinating the landmarks between the two medical images based on the evaluated value.

2. A medical image-processing apparatus according to claim 1, wherein said coordinating part executes the processes of:
when a group of three landmarks is formed by adding one landmark that is not contained in the tentative pair, calculating the distance between the one landmark and each of the landmarks in the pair;
tentatively coordinating the groups of two medical images when the difference of distance is the predetermined value or less; and
calculating the evaluated value based on said tentative groups.

3. A medical image-processing apparatus according to claim 1, wherein said coordinating part executes the processes of:
tentatively coordinating the groups of three or more landmarks by sequentially adding a landmark with said difference of distance of the predetermined value or less to the tentative pair; and
calculating the evaluated value based on said tentative groups.

4. A medical image-processing apparatus according to claim 1, wherein said coordinating part executes the processes of:
calculating the distance between two landmarks contained in the group of landmarks; and
attaching a score to the landmark having a difference of distance between two medical images that exceeds the predetermined value, to calculate the evaluated value based on the landmark having said score within a predetermined range.

5. A medical image-processing apparatus according to claim 4, wherein said evaluated value is the number of landmarks having said score within the predetermined range.

6. A medical image-processing apparatus that aligns volume data of two medical images, comprising:
a setting part configured to set landmarks of medical images based on each set of volume data;
a generating part configured to generate positional relationship information that indicates the positional relationships of said landmarks with regard to each set of volume data;
a coordinating part configured to coordinate between the landmarks of two medical images that remain after eliminating some of the landmarks based on said positional relationship information; and
an alignment part configured to align two sets of volume data based on said coordination of landmarks, wherein said alignment part executes the processes of:
calculating a coordinate transformation parameter for aligning the position of one set of the volume data to the position of the other set of volume data based on the landmarks that have been coordinated by the coordinating part; and
aligning the two sets of volume data based on a predetermined continuous function based on the parameter, and wherein said predetermined continuous function is a smooth function.

7. A medical image-processing apparatus according to claim 6, wherein said smooth function is a polynomial.

8. A medical image-processing apparatus according to claim 7, wherein said alignment part calculates a solution to the polynomial using linear optimization method and aligns the two sets of volume data based on the solution.

* * * * *